(12) United States Patent
Shin et al.

(10) Patent No.: US 9,603,099 B2
(45) Date of Patent: Mar. 21, 2017

(54) APPARATUS AND METHOD FOR UPLINK POWER CONTROL FOR A WIRELESS TRANSMITTER/RECEIVER UNIT UTILIZING MULTIPLE CARRIERS

(71) Applicant: INTERDIGITAL PATENT HOLDINGS, INC., Wilmington, DE (US)

(72) Inventors: Sung-Hyuk Shin, Northvale, NJ (US); Guodong Zhang, Syosset, NY (US); Janet A. Stern-Berkowitz, Little Neck, NY (US); Philip J. Pietraski, Jericho, NY (US); Stephen G. Dick, Nesconset, NY (US); Joseph S. Levy, Merrick, NY (US); Kyle Jung-Lin Pan, Saint James, NY (US); Erdem Bala, Farmingdale, NY (US); Marian Rudolf, Montreal (CA); Stephen E. Terry, Northport, NY (US); Changsoo Koo, Melville, NY (US); Charles A. Dennean, Melville, NY (US); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/658,792

(22) Filed: Mar. 16, 2015

(65) Prior Publication Data

US 2015/0189601 A1    Jul. 2, 2015

Related U.S. Application Data

(63) Continuation of application No. 12/703,092, filed on Feb. 9, 2010, now Pat. No. 8,982,801.

(Continued)

(51) Int. Cl.
*H04L 1/00* (2006.01)
*H04W 52/14* (2009.01)
(Continued)

(52) U.S. Cl.
CPC ......... *H04W 52/146* (2013.01); *H04W 52/16* (2013.01); *H04W 52/242* (2013.01);
(Continued)

(58) Field of Classification Search
CPC ..... H04W 52/02; H04W 52/03; H04W 52/04; H04W 24/00; H04W 24/01; H04W 24/02;
(Continued)

(56) References Cited

U.S. PATENT DOCUMENTS 5,491,837 A    2/1996 Haartsen
5,687,171 A    11/1997 Shin et al.
(Continued)

FOREIGN PATENT DOCUMENTS

CN    1716837 A    1/2006
CN    1792066 A    6/2006
(Continued)

OTHER PUBLICATIONS

3rd Generation Partnership Project (3GPP), R1-091248, "Concurrent PUSCH and PUCCH Transmissions", Samsung, 3GPP TSG RAN WG1 #56bis, Seoul, Korea, Mar. 23-27, 2009, 2 pages.
(Continued)

*Primary Examiner* — Dady Chery
(74) *Attorney, Agent, or Firm* — Condo Roccia Koptiw LLP

(57) ABSTRACT

A method and apparatus for determining uplink power in a wireless transmit receive unit (WTRU). The WTRU operates in a carrier aggregated system. The WTRU is configured to receive a plurality of uplink power parameters indexed to one of a plurality of uplink carriers and receive a transmit
(Continued)

power control command indexed to the one of the plurality of uplink carriers. The WTRU is configured to determine a pathloss of the one of the plurality of uplink carriers and determine a transmit power for the one of the plurality of uplink carriers based on the plurality of power parameters, the transmit power control command, and the pathloss.

16 Claims, 9 Drawing Sheets

Related U.S. Application Data

(60) Provisional application No. 61/151,174, filed on Feb. 9, 2009, provisional application No. 61/152,351, filed on Feb. 13, 2009, provisional application No. 61/234,226, filed on Aug. 14, 2009.

(51) Int. Cl.
| | |
|---|---|
| *H04W 52/24* | (2009.01) |
| *H04W 52/28* | (2009.01) |
| *H04W 52/16* | (2009.01) |
| *H04W 72/04* | (2009.01) |
| *H04W 52/08* | (2009.01) |
| *H04W 52/10* | (2009.01) |

(52) U.S. Cl.
CPC ..... *H04W 52/281* (2013.01); *H04W 72/0413* (2013.01); *H04W 72/0473* (2013.01); *H04W 52/08* (2013.01); *H04W 52/10* (2013.01)

(58) Field of Classification Search
CPC ......... H04W 24/03; H04W 24/04; H04J 3/14; H04J 3/15; H04J 3/16; H04J 3/17; H04J 3/18
USPC ................... 370/252, 241, 311; 455/522, 69
See application file for complete search history.

(56) References Cited

U.S. PATENT DOCUMENTS

| | | | |
|---|---|---|---|
| 5,845,212 A | 12/1998 | Tanaka | |
| 5,991,618 A | 11/1999 | Hall | |
| 6,587,697 B2 | 7/2003 | Terry et al. | |
| 7,054,633 B2 | 5/2006 | Seo et al. | |
| 7,403,791 B2 | 7/2008 | Oki et al. | |
| 7,590,095 B2 | 9/2009 | Chen et al. | |
| 7,751,847 B2 | 7/2010 | Karlsson | |
| 8,228,855 B2 | 7/2012 | Sambhwani et al. | |
| 8,315,320 B2 | 11/2012 | Zhang et al. | |
| 8,335,466 B2 | 12/2012 | Cai et al. | |
| 8,355,388 B2 | 1/2013 | Womack et al. | |
| 8,402,334 B2 | 3/2013 | Yu et al. | |
| 8,446,856 B2 | 5/2013 | Womack et al. | |
| 8,699,391 B2 | 4/2014 | Yeon et al. | |
| 8,711,722 B2 | 4/2014 | Zhu et al. | |
| 2003/0232622 A1 | 12/2003 | Seo et al. | |
| 2004/0223455 A1 | 11/2004 | Fong et al. | |
| 2005/0085191 A1* | 4/2005 | Iacono | H04W 52/16 455/67.11 |
| 2005/0111391 A1 | 5/2005 | Oki et al. | |
| 2005/0169293 A1* | 8/2005 | Zhang | H04W 52/146 370/437 |
| 2006/0003787 A1 | 1/2006 | Heo et al. | |
| 2006/0270431 A1 | 11/2006 | Yoshi | |
| 2007/0010269 A1 | 1/2007 | Azuma | |
| 2008/0039057 A1 | 2/2008 | Worrall et al. | |
| 2008/0198800 A1 | 8/2008 | Zhang et al. | |
| 2008/0220806 A1 | 9/2008 | Shin et al. | |
| 2009/0046642 A1 | 2/2009 | Damnjanovic | |
| 2009/0131027 A1 | 5/2009 | Breuer et al. | |
| 2009/0175187 A1* | 7/2009 | Jersenius | H04W 52/365 370/252 |
| 2009/0191910 A1 | 7/2009 | Athalye et al. | |
| 2009/0213805 A1 | 8/2009 | Zhang et al. | |
| 2009/0239590 A1 | 9/2009 | Parkvall | |
| 2009/0290538 A1 | 11/2009 | Kim et al. | |
| 2010/0041428 A1 | 2/2010 | Chen et al. | |
| 2010/0098012 A1 | 4/2010 | Bala et al. | |
| 2010/0113004 A1 | 5/2010 | Cave et al. | |
| 2010/0113057 A1 | 5/2010 | Englund et al. | |
| 2010/0120446 A1 | 5/2010 | Gaal | |
| 2010/0158147 A1 | 6/2010 | Zhang et al. | |
| 2010/0238892 A1 | 9/2010 | Dahlman et al. | |
| 2010/0246561 A1 | 9/2010 | Shin et al. | |
| 2010/0296470 A1 | 11/2010 | Heo et al. | |
| 2010/0297993 A1 | 11/2010 | Heo et al. | |
| 2011/0038271 A1 | 2/2011 | Shin et al. | |
| 2011/0039568 A1 | 2/2011 | Zhang et al. | |
| 2011/0064159 A1 | 3/2011 | Ko et al. | |
| 2011/0105173 A1 | 5/2011 | Haim et al. | |
| 2011/0134968 A1 | 6/2011 | Han et al. | |
| 2011/0141928 A1 | 6/2011 | Shin et al. | |
| 2011/0195735 A1 | 8/2011 | Irmer et al. | |
| 2011/0207415 A1 | 8/2011 | Luo et al. | |
| 2011/0280169 A1 | 11/2011 | Seo et al. | |
| 2012/0034927 A1 | 2/2012 | Papasakellariou et al. | |
| 2012/0093020 A1 | 4/2012 | Iwai et al. | |
| 2012/0113831 A1 | 5/2012 | Pelletier et al. | |
| 2012/0115520 A1 | 5/2012 | Roessel et al. | |
| 2012/0149428 A1 | 6/2012 | Yang | |
| 2012/0213189 A1 | 8/2012 | Choi et al. | |
| 2012/0295611 A1 | 11/2012 | Amirijoo et al. | |
| 2013/0010706 A1 | 1/2013 | Kela et al. | |
| 2013/0028231 A1 | 1/2013 | Zhang et al. | |
| 2013/0308575 A1 | 11/2013 | Chen et al. | |
| 2014/0293843 A1 | 10/2014 | Papasakellariou et al. | |

FOREIGN PATENT DOCUMENTS

| | | |
|---|---|---|
| CN | 101030795 A | 9/2007 |
| CN | 101099304 A | 1/2008 |
| CN | 101176317 A | 5/2008 |
| CN | 101404527 A | 4/2009 |
| CN | 101505498 A | 8/2009 |
| CN | 101610102 A | 12/2009 |
| EP | 0631397 A2 | 12/1994 |
| EP | 1367739 A1 | 12/2003 |
| EP | 1605605 A2 | 12/2005 |
| EP | 1811683 A2 | 7/2007 |
| EP | 1811685 A2 | 7/2007 |
| EP | 1912345 A1 | 4/2008 |
| EP | 2293618 A1 | 3/2011 |
| JP | 2005-167963 A | 6/2005 |
| JP | 2006-014304 A | 1/2006 |
| JP | 2008-236675 A | 10/2008 |
| JP | 2008306674 A | 12/2008 |
| JP | 2011-514035 A | 4/2011 |
| JP | 2011-515997 A | 5/2011 |
| JP | 2012-511295 A | 5/2012 |
| JP | 2012-516608 A | 7/2012 |
| JP | 2012-531128 A | 12/2012 |
| JP | 2013-504921 A | 2/2013 |
| JP | 5205456 B2 | 6/2013 |
| RU | 2251220 C2 | 4/2005 |
| RU | 2267222 C2 | 12/2005 |
| RU | 2006-108531 A | 7/2006 |
| RU | 2297733 C2 | 4/2007 |
| RU | 2011102436 A | 7/2012 |
| TW | 2006/18508 A | 6/2006 |
| TW | 2006/37207 A | 10/2006 |
| TW | 2008/38188 A | 9/2008 |
| TW | 2009/17711 A | 4/2009 |
| WO | WO 01/61884 A1 | 8/2001 |
| WO | WO 03/003593 A2 | 1/2003 |
| WO | WO 2004/056009 A1 | 7/2004 |
| WO | WO 2005/018125 A1 | 2/2005 |
| WO | WO 2006/095224 A1 | 9/2006 |
| WO | WO 2006/096789 A1 | 9/2006 |
| WO | WO 2008/042187 A2 | 4/2008 |
| WO | WO 2008/055235 A2 | 5/2008 |
| WO | WO 2008/101053 A2 | 8/2008 |

(56) References Cited

FOREIGN PATENT DOCUMENTS

| WO | WO 2008/109162 A2 | 9/2008 |
|---|---|---|
| WO | WO 2008/155469 A1 | 12/2008 |
| WO | WO 2009/099271 A1 | 8/2009 |
| WO | WO 2010/077690 A1 | 7/2010 |
| WO | WO 2010/091425 A2 | 8/2010 |
| WO | WO 2010/107885 A2 | 9/2010 |
| WO | WO 2010/121708 A1 | 10/2010 |
| WO | WO 2010/135697 A2 | 11/2010 |
| WO | WO 2010/148532 A1 | 12/2010 |
| WO | WO 2010/150552 A1 | 12/2010 |

OTHER PUBLICATIONS

3rd Generation Partnership Project (3GPP), R1-081464, "Triggers for Power Headroom Reports in EUTRAN Uplink", Nokia Siemens Networks, Nokia, 3GPP TSG RAN WG1 Meeting #52bis, Shenzhen, China, Mar. 31-Apr. 4, 2008, 2 pages.
3rd Generation Partnership Project (3GPP), R1-082468, "Carrier Aggregation in LTE-Advanced", Ericsson, 3GPP TSG-RAN WG1 #53bis, Warsaw, Poland, Jun. 30-Jul. 4, 2008, 6 pages.
3rd Generation Partnership Project (3GPP), R1-082807, "CM Analysis of UL Transmission for LTE-A", InterDigital Communications, LLC, 3GPP TSG-RAN WG1 Meeting #54, Jeju, Korea, Aug. 18-22, 2008, 8 pages.
3rd Generation Partnership Project (3GPP), R1-084398, "Aspects to Consider for DL Transmission Schemes of LTE-A", Qualcomm Europe, 3GPP TSG-RAN WG1 #55, Prague, Czech Republic, Nov. 10-14, 2008, 11 pages.
3rd Generation Partnership Project (3GPP), R1-084702, "To Fix the Discrepancy of Uplink Power Control and Channel Coding of Control Information in PUSCH", 3GPP TSG-RAN1 Meeting #55, Prague, Czech, Nov. 10-14, 2008, 2 pages.
3rd Generation Partnership Project (3GPP), R1-090234, "UL Control Signalling to Support Bandwidth Extension in LTE Advanced", Nokia Siemens Networks, Nokia, Ljubljana, Slovenia, Jan. 12-16, 2009, 5 pages.
3rd Generation Partnership Project (3GPP), R1-090362, "Support of Concurrent Transmission of PUCCH and PUSCH in LTE-A Uplink", Qualcomm Europe, 3GPP TSG RAN WG1 #55bis, Ljubljana, Slovenia, Jan. 12-16, 2009, 3 pages.
3rd Generation Partnership Project (3GPP), R1-090363, "CM Analysis of Concurrent PUSCH and PUCCH UL Transmission for LTE-A", Qualcomm Europe, 3GPP TSG RAN WG1 #55bis, Ljubljana, Slovenia, Jan. 12-16, 2009, 7 pages.
3rd Generation Partnership Project (3GPP), R1-090430, "Alignment of RAN1/RAN4 Specification on UE maximum Output Power", LG Electronics, Ericsson, Panasonic, NTT Docomo, Nokia Siemens Network, Nokia, 3GPP TSG-RAN WG1 Meeting #55bis, Ljubljana, Slovenia, Jan. 12-16, 2009, 9 pages.
3rd Generation Partnership Project (3GPP), R1-090544, "Text Proposal for TR36.814 on Uplink Transmission Scheme", Ericsson, Ljubljana, Slovenia, Jan. 12-16, 2009, 2 pages.
3rd Generation Partnership Project (3GPP), R1-090611, "Concurrent PUSCH and PUCCH Transmissions", Samsung, 3GPP TSG RAN WG1 #56, Athens, Greece, Feb. 9-13, 2009, 2 pages.
3rd Generation Partnership Project (3GPP), R1-090654, "PUCCH Piggybacking onto PUSCH in Case of Transmit Power Limitation", LG Electronics, 3GPP TSG RAN WG1 #56, Athens, Greece, Feb. 9-13, 2009, 5 pages.
3rd Generation Partnership Project (3GPP), R1-090655, "Uplink Multiple Channel Transmission in Case of UE Transmit Power Limitation", LG Electronics, 3GPP TSG RAN WG1#56, Athens, Greece, Feb. 9-13, 2009, 3 pages.
3rd Generation Partnership Project (3GPP), R1-090738, "PUSCH Power Control for LTE-Advanced", Nokia Siemens Networks, Nokia, 3GPP TSG RAN WG1 #56 Meeting, Athens, Greece, Feb. 9-13, 2009, 4 pages.

3rd Generation Partnership Project (3GPP), R1-092415, "Uplink Power Control for Carrier Aggregation", Research in Motion, UK Limited, 3GPP TSG RAN WG1 Meeting #57b, Los Angeles, USA, Jun. 29-Jul. 3, 2009, 3 pages.
3rd Generation Partnership Project (3GPP), R1-092574, "PUSCH Power Control for LTE-Advanced", Nokia Siemens Networks, Nokia, 3GPP TSG RAN WG1 #57bis Meeting, Los Angeles, CA, USA, Jun. 29-Jul. 3, 2009, 4 pages.
3rd Generation Partnership Project (3GPP), R1-092670, "UL Transmission Power Control in LTE-A", Samsung, 3GPP TSG RAN WG1 #57bis, Los Angeles, USA, Jun. 29-Jul. 3, 2009, 5 pages.
3rd Generation Partnership Project (3GPP), R1-092983, "LS on Power Amplifier Configurations for UEs with Multiple Transmit Antennas", Qualcomm Europe, 3GPP TSG-WG1 #57bis, Los Angeles, USA, Jun. 29-Jul. 3, 2009, 2 pages.
3rd Generation Partnership Project (3GPP), R1-093070, "Proposed Way Forward on UL Power Control for LTE-A Bandwidth Extension" InterDigital Communications, LLC, 3GPP TSG-RAN WG1 Meeting #58, Shenzhen, China, Aug. 24-28, 2009, 3 pages.
3rd Generation Partnership Project (3GPP), R1-093297, "Uplink Power Control for Carrier Aggregation", Research in Motion UK Limited, 3GPP TSG RAN WG1 Meeting #58, Shenzhen, China, Aug. 24-28, 2009, pp. 1-3.
3rd Generation Partnership Project (3GPP), R1-094274, "Uplink Power Control for Carrier Aggregation", Ericsson, ST-Ericsson, 3GPP TSG RAN WG1 Meeting #58bis, Oct. 12-16, 2009, 4 pages.
3rd Generation Partnership Project (3GPP), R1-094470, "Uplink Power Control in LTE-Advanced", LG Electronics, 3GPP TSG RAN WG1 #59, Jeju, Korea, Nov. 9-13, 2009, pp. 1-5.
3rd Generation Partnership Project (3GPP), R1-100071, "Considerations on Uplink Power Control in LTE-Advanced", CATT, 3GPP TSG RAN WG1 Meeting #59bis, Valencia, Spain, Jan. 18-22, 2010, 3 pages.
3rd Generation Partnership Project (3GPP), R1-101715, "LS Reply on Uplink Power Control in LTE-A", 3GPP TSG-RAN WG1 Meeting #60bis, Beijing, China, Apr. 12-16, 2010, 2 pages.
3rd Generation Partnership Project (3GPP), R1-102601, "Final Report of 3GPP TSG RAN WG1 #60bis V1.0.0, Beijing, China, Apr. 12-16, 2010", MCC Support, 3GPP TSG RAN WG1 Meeting #61, Montreal, Canada, May 10-14, 2010, 85 pages.
3rd Generation Partnership Project (3GPP), R1-104183, "Final Report of 3GPP TSG RAN WG1 #61 V3.0.0", 3GPP TSG RAN WG1 Meeting #61bis, Dresden, Germany, Jun. 28-Jul. 2, 2010, 83 pages.
3rd Generation Partnership Project (3GPP), R2 085326, "Considering about PHR", CATT, 3GPP TSG RAN WG2 #63bis, Prague, Czech Republic, Sep. 29-Oct. 3, 2008, 6 pages.
3rd Generation Partnership Project (3GPP), TDOC R2-103580, "Summary of E-mail Discussion [70#15] LTE CA: PHR Handling", Ericsson, 3GPP TSG-RAN WG2 #70bis, Stockholm, Sweden, Jun. 28-Jul. 2, 2010, 17 pages.
3rd Generation Partnership Project (3GPP), TR 36.814 V0.4.1, "Technical Specification Group Radio Access Network, Further Advancements for E-UTRA Physical Layer Aspects (Release 9)", Feb. 2009, pp. 1-31.
3rd Generation Partnership Project (3GPP), TR 36.814 V1.5.0, "Technical Specification Group Radio Access Network, Further Advancements for E-UTRA Physical Layer Aspects (Release 9)", Nov. 2009, pp. 1-53.
3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, pp. 1-104.
3rd Generation Partnership Project (3GPP), TS 25.101 V8.5.1, "Technical Specification Group Radio Access Network, User Equipment (UE) Radio Transmission and Reception (FDD) (Release 8)", Jan. 2009, pp. 1-214.
3rd Generation Partnership Project (3GPP), TS 25.101 V8.9.0, "Technical Specification Group Radio Access Network, User Equipment (UE) Radio Transmission and Reception (FDD) (Release 8)", Dec. 2009, pp. 1-217.

(56) References Cited

OTHER PUBLICATIONS

3rd Generation Partnership Project (3GPP), TS 25.101 V9.2.0, "3rd Generation Partnership Project, Technical Specification Group Radio Access Network, User Equipment (UE) Radio Transmission and Reception (FDD) (Release 9)", Dec. 2009, pp. 1-244.
3rd Generation Partnership Project (3GPP), TS 36.133 V8.10.0, "Technical Specification Group Radio Access Network, Evolved Universal Terrestrial Radio Access (E-UTRA), Requirements for Support of Radio Resource Management (Release 8)", Jun. 2010, pp. 1-328.
3rd Generation Partnership Project (3GPP), TS 36.133 V8.7.0, "Technical Specification Group Radio Access Network, Evolved Universal Terrestrial Radio Access (E-UTRA), Requirements for Support of Radio Resource Management (Release 8)", Sep. 2009, pp. 1-317.
3rd Generation Partnership Project (3GPP), TS 36.133 V9.1.0, "Technical Specification Group Radio Access Network, Evolved Universal Terrestrial Radio Access (E-UTRA), Requirements for Support of Radio Resource Management (Release 9)", Sep. 2009, pp. 1-318.
3rd Generation Partnership Project (3GPP), TS 36.133 V9.4.0, "Technical Specification Group Radio Access Network, Evolved Universal Terrestrial Radio Access (E-UTRA), Requirements for Support of Radio Resource Management (Release 9)", Jun. 2006, pp. 1-377.
3rd Generation Partnership Project (3GPP), TS 36.213 V10.0.0, "Technical Specification Group Radio Access Network, Evolved Universal Terrestrial Radio Access (E-UTRA), Physical Layer Procedures (Release 10)", Dec. 2010, pp. 1-98.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.
3rd Generation Partnership Project (3GPP), TS 36.213 V9.2.0, "Technical Specification Group Radio Access Network, Evolved Universal Terrestrial Radio Access (E-UTRA), Physical Layer Procedures (Release 9)", Jun. 2010, pp. 1-80.
3rd Generation Partnership Project (3GPP), TS 36.321 V8.3.0, "Technical Specification Group Radio Access Network, Evolved Universal Terrestrial Radio Access (E-UTRA) Medium Access Control (MAC) Protocol Specification (Release 8)", Sep. 2008, pp. 1-36.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.
3rd Generation Partnership Project (3GPP), TS 36.321 V8.8.0, "3rd Generation Partnership Project, Technical Specification Group Radio Access Network, Evolved Universal Terrestrial Radio Access (E-UTRA) Medium Access Control (MAC) Protocol Specification (Release 8)", Dec. 2009, pp. 1-47.
3rd Generation Partnership Project (3GPP), TS 36.321 V8.9.0, "Technical Specification Group Radio Access Network, Evolved Universal Terrestrial Radio Access (E-UTRA), Medium Access Control (MAC) Protocol Specification (Release 8)", Jun. 2010, pp. 1-47.
3rd Generation Partnership Project (3GPP), TS 36.321 V9.0.0, "Technical Specification Group Radio Access Network, Evolved Universal Terrestrial Radio Access (E-UTRA) Medium Access Control (MAC) Protocol Specification (Release 9)", Sep. 2009, pp. 1-47.
3rd Generation Partnership Project (3GPP), TS 36.321 V9.1.0, "Technical Specification Group Radio Access Network, Evolved Universal Terrestrial Radio Access (E-UTRA) Medium Access Control (MAC) Protocol Specification (Release 9)", Dec. 2009, pp. 1-48.
3rd Generation Partnership Project (3GPP), TS 36.321 V9.3.0, "Technical Specification Group Radio Access Network, Evolved Universal Terrestrial Radio Access (E-UTRA), Medium Access Control (MAC) Protocol Specification (Release 9)", Jun. 2010, pp. 1-48.
3rd Generation Partnership Project (3GPP), TS 36.331 V8.10.0, "Technical Specification Group Radio Access Network, Evolved Universal Terrestrial Radio Access (E-UTRA), Radio Resource Control (RRC), Protocol Specification (Release 8)", Jun. 2010, pp. 1-211.
3rd Generation Partnership Project (3GPP), TS 36.331 V8.4.0, "Technical Specification Group Radio Access Network, Evolved Universal Terrestrial Radio Access (E-UTRA) Radio Resource Control (RRC), Protocol Specification (Release 8)", Dec. 2008, pp. 1-198.
3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.
3rd Generation Partnership Project (3GPP), TS 36.331 V9.0.0, "Technical Specification Group Radio Access Network, Evolved Universal Terrestrial Radio Access (E-UTRA) Radio Resource Control (RRC), Protocol Specification (Release 9)", pp. 1-213.
3rd Generation Partnership Project (3GPP), TS 36.331 V9.1.0, "Technical Specification Group Radio Access Network, Evolved Universal Terrestrial Radio Access (E-UTRA) Radio Resource Control (RRC), Protocol Specification (Release 9)", Dec. 2009, pp. 1-233.
3rd Generation Partnership Project (3GPP), TS 36.331 V9.3.0, "Technical Specification Group Radio Access Network, Evolved Universal Terrestrial Radio Access (E-UTRA), Radio Resource Control (RRC), Protocol Specification (Release 9)", Jun. 2010, pp. 1-250.
3rd Generation Partnership Project(3GPP), TS 36.321 V8.7.0, "Technical Specification Group Radio Access Network, Evolved Universal Terrestrial Radio Access (E-UTRA), Medium Access Control (MAC) Protocol Specification (Release 8)", Sep. 2009, pp. 1-47.
European Telecommunications Standards Institute (ETSI), TS 136 213 V8.4.0, "LTE, Evolved Universal Terrestrial Radio Access (E-UTRA), Physical Layer Procedures (3GPP TS 36.213 version 8.4.0 Release 8)", Nov. 2008, pp. 1-61.
Shen et al., "3GPP Long Term Evolution: Principle and System Design", Nov. 2008, pp. 1-7.
3rd Generation Partnership Project (3GPP), R1-092669, "Concurrent PUSCH and PUCCH Transmissions" 3GPP TSG RAN WG1 #57bis, Samsung, Los Angeles, USA, Jun. 29-Jul. 3, 2009, 2 pages.
3rd Generation Partnership Project (3GPP), R1-093307, "Uplink DM RS Performance Evaluation from CoMP Viewpoint", Nokia Siemens Networks, 3GPP TSG RAN WG1 Meeting #58, Shenzhen, China, Aug. 24-28, 2009, 6 pages.
3rd Generation Partnership Project (3GPP), R1-093840, "UL Power Control in Carrier Aggregation", Huawei, 3GPP TSG RAN WG1 Meeting #58bis Miyazaki, Japan, Oct. 12-16, 2009, 4 pages.
3rd Generation Partnership Project (3GPP), R1-105238, "Further Discussion on HeNB Downlink Power Setting in HetNet", MediaTek Inc., TSG-RAN WG1 #62bis, Xi'an, China, Oct. 11-15, 2010, pp. 1-5.
3rd Generation Partnership Project (3GPP), R1-112085, "Potential Enhancements for SRS in Rel-11", TSG RAN WG1 Meeting #66, Ericsson, ST-Ericsson, Athens, Greece, Aug. 22-26, 2011, 8 pages.

(56) References Cited

OTHER PUBLICATIONS

3rd Generation Partnership Project (3GPP), R1-112372, "PRACH Enhancement and UL Power Control for CoMP Scenario 4", Research in Motion, 3GPP TSG RAN WG1 Meeting #66, Athens, Greece, Aug. 22-26, 2011, pp. 1-6.

3rd Generation Partnership Project (3GPP), R1-112426, "Standardization Support for UL CoMP", TSG RAN WG1 Meeting #66, Ericsson, ST-Ericsson, Athens, Greece, Aug. 22-26, 2011, 3 pages.

3rd Generation Partnership Project (3GPP), RP-111365, "Coordinated Multi-Point Operation for LTE—Uplink Core Part", Sep. 2011, 6 pages.

3rd Generation Partnership Project (3GPP), TR 36.819 V1.2.0, "Technical Specification Group Radio Access Network, Coordinated Multi-Point Operation for LTE Physical Layer Aspects (Release 11)", Sep. 2011, pp. 1-70.

3rd Generation Partnership Project (3GPP), TS 36.211 V10.3.0, "Technical Specification Group Radio Access Network, Evolved Universal Terrestrial Radio Access (E-UTRA), Physical Channels and Modulation (Release 10)", Sep. 2011, pp. 1-103.

3rd Generation Partnership Project (3GPP), TS 36.213 V8.7.0, "Technical Specification Group Radio Access Network, Evolved Universal Terrestrial Radio Access (E-UTRA), Physical Layer Procedures (Release 8)", May 2009, pp. 1-77.

3rd Generation Partnership Project (3GPP), TS 36.331 V10.2.0, "Technical Specification Group Radio Access Network, Evolved Universal Terrestrial Radio Access (E-UTRA), Radio Resource Control (RRC), Protocol Specification (Release 10)", Jun. 2011, pp. 1-294.

$3^{rd}$ Generation Partnership Project (3GPP), R1-093840, "UL Power Control in Carrier Aggregation" Huawei, TSG RAN WG1, Meeting # 58 bis, Oct. 2009, 4 pages.

$3^{rd}$ Generation Partnership Project (3GPP), R1-092265 "Clarification on RNTI for TPC command", ASUSTeK, Ericsson, Nokia, Nokia Siemens Networks, 3GPP TSG-RAN WG1, Meeting #57, San Francisco, USA, May 4-8, 2009, 7 pages.

$3^{rd}$ Generation Partnership Project (3GPP), R1-105098, "Introduction of Rel-10 LTE-Advanced features in 36.213", Motorola, 3GPP TSG-RAN, Meeting #62, Madrid, Spain, Aug. 23-27, 2010, 2 pages.

$3^{rd}$ Generation Partnership Project (3GPP), R2-093723, "Impact of CA on MAC layer", CATT, 3GPP TSG RAN WG2, Meeting #66 bis, Los Angeles, USA, Jun. 29- Jul. 3, 2009, 3 pages.

$3^{rd}$ Generation Partnership Project (3GPP), R2-093886, "Considerations on scheduling in carrier aggregation", ZTE, 3GPP TSG RAN WG2, Meeting # 66 bis, Los Angeles, USA, Jun. 29 — Jul. 3, 2009, 4 pages.

\* cited by examiner

APPARATUS AND METHOD FOR UPLINK POWER CONTROL FOR A WIRELESS TRANSMITTER/RECEIVER UNIT UTILIZING MULTIPLE CARRIERS

CROSS REFERENCE TO RELATED APPLICATION

This application is a continuation of U.S. patent application Ser. No. 12/703,092 filed Feb. 9, 2010, which claims the benefit of U.S. Provisional Application No. 61/151,174 filed Feb. 9, 2009, 61/152,351 filed Feb. 13, 2009 and 61/234,226 filed Aug. 14, 2009, which are all incorporated by reference as if fully set forth herein, for all purposes.

FIELD OF INVENTION

This application is related to wireless communications.

BACKGROUND

Wireless communication systems may use many techniques to increase throughput and user services. One such technique is carrier aggregation and support of flexible bandwidth. Another technique is to transmit both uplink data and control channels simultaneously. For example, in an advanced long term evolution (LTE-A) compliant system, uplink (UL) channels may be transmitted simultaneously, such as the physical uplink shared channel (PUSCH) and physical uplink control channel (PUCCH).

Carrier aggregation adds complexity to transmit power control schemes in a wireless transmit receive unit (WTRU). A base station, such as an eNodeB (eNB), for example, may have much of the information required for a WTRU to determine its UL power requirements. In single carrier system, the eNB can give the WTRU that information when it gives the WTRU other information. For example, the eNB may provide the WTRU with UL power control configuration data when providing the WTRU with an UL grant. However, when multiple carriers are used and simultaneous transmission of uplink control and data channels is implemented, the WTRU may receive uplink configuration information that is complex. A WTRU may perform complex operations to properly control UL transmission power.

SUMMARY

A method and apparatus for determining uplink power in a wireless transmit receive unit (WTRU) are disclosed. This may include operating the WTRU in a carrier aggregated system. This may also include the WTRU receiving a plurality of uplink power parameters indexed to one of a plurality of uplink carriers and receiving a transmit power control command indexed to the one of the plurality of uplink carriers. The WTRU may determine a pathloss of the one of the plurality of uplink carriers and determine a transmit power for the one of the plurality of uplink carriers based on the plurality of power parameters, the transmit power control command, and the pathloss.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
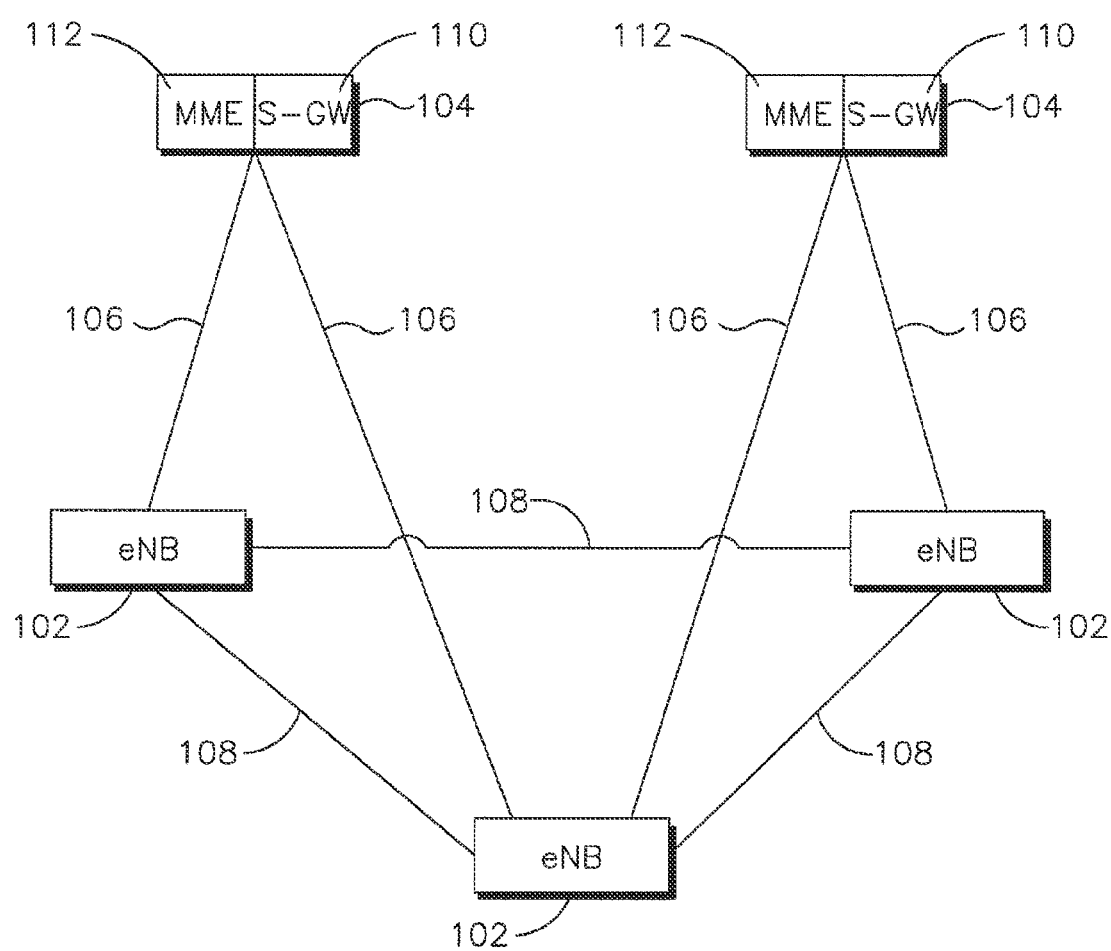
FIG. 1 shows an overview of an Evolved Universal Mobile Telecommunications System (UMTS) Terrestrial Radio Access Network (E-UTRAN)

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104. The EPC 104 includes a Mobility Management Entity (MME) 112 and a Serving Gateway (S-GW) 110. Other network configurations may be used, and nothing disclosed herein is limited to any one particular network configuration or architecture.

Figure 2:
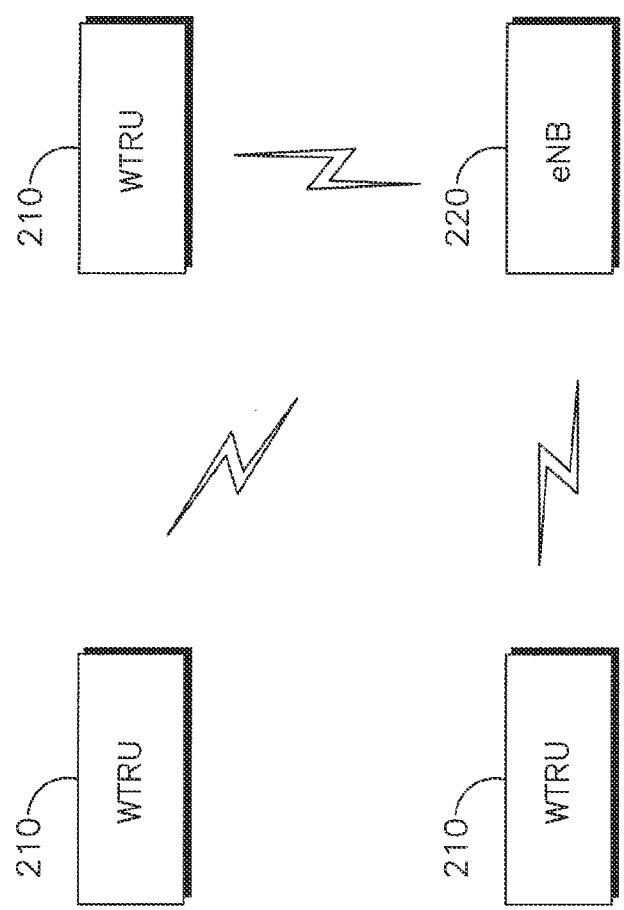
FIG. 2 shows a wireless communication system including a plurality of wireless transmit receive units (WTRUs) and an e Node B (eNB)

In a wireless communication system, a wireless transmit receive unit (WTRU) may communicate with an e Node-B (eNB). FIG. 2 shows a wireless communication system 200 including a plurality of WTRUs 210 and an eNB 220. As shown in FIG. 2, the WTRUs 210 are in communication with the eNB 220. Although three WTRUs 210 and one eNB 220 are shown in FIG. 2, it should be noted that any combination of wireless and wired devices may be included in the wireless communication system 200.

Figure 3:
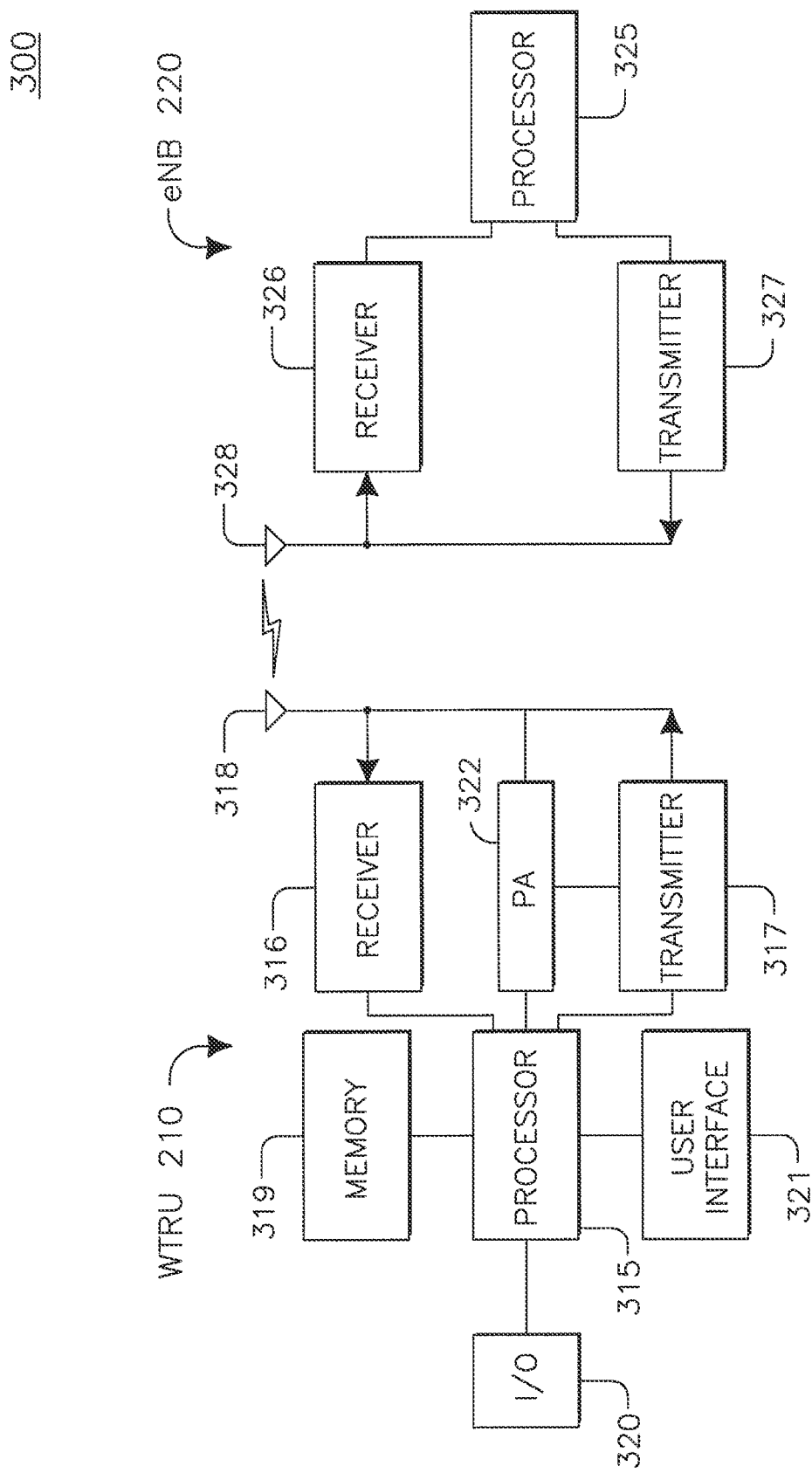
FIG. 3 is a functional block diagram of the WTRU and the eNB of the wireless communication system of FIG. 2.

FIG. 3 is a functional block diagram 300 of the WTRU 210 and the eNB 220 of the wireless communication system 200 of FIG. 2. As shown in FIG. 2, the WTRU 210 is in communication with the eNB 220. The WTRU 210 is configured to transmit and receive on a single carrier or on multiple carriers. The carriers may be contiguous or non-contiguous.

In addition to the components that may be found in a typical WTRU, the WTRU 210 includes a processor 315, a receiver 316, a transmitter 317, and an antenna 318. The WTRU 210 may also include a user interface 321, which may include, but is not limited to, an LCD or LED screen, a touch screen, a keyboard, a stylus, or any other typical input/output device. The WTRU 310 may also include memory 319, both volatile and non-volatile as well as interfaces 320 to other WTRUs, such as USB ports, serial ports and the like. The receiver 316 and the transmitter 317 are in communication with the processor 315. The antenna 318 is in communication with both the receiver 316 and the transmitter 317 to facilitate the transmission and reception of wireless data. The WTRU 210 may also include a power amplifier module 322 that is in communication with the processor 315 and transmitter 317 and the receiver 316. The power amplifier module 322 may include a single or multiple power amplifiers. The power amplifier module 322 may alternatively be located in the transmitter 317.

In addition to the components that may be found in a typical eNB, the eNB 220 includes a processor 325, a receiver 326, a transmitter 327, and an antenna 328. The receiver 326 and the transmitter 327 are in communication with the processor 325. The antenna 328 is in communication with both the receiver 326 and the transmitter 327 to facilitate the transmission and reception of wireless data. Although a single antenna 328 is disclosed, the eNB 220 may include multiple antennas.

Figure 4:
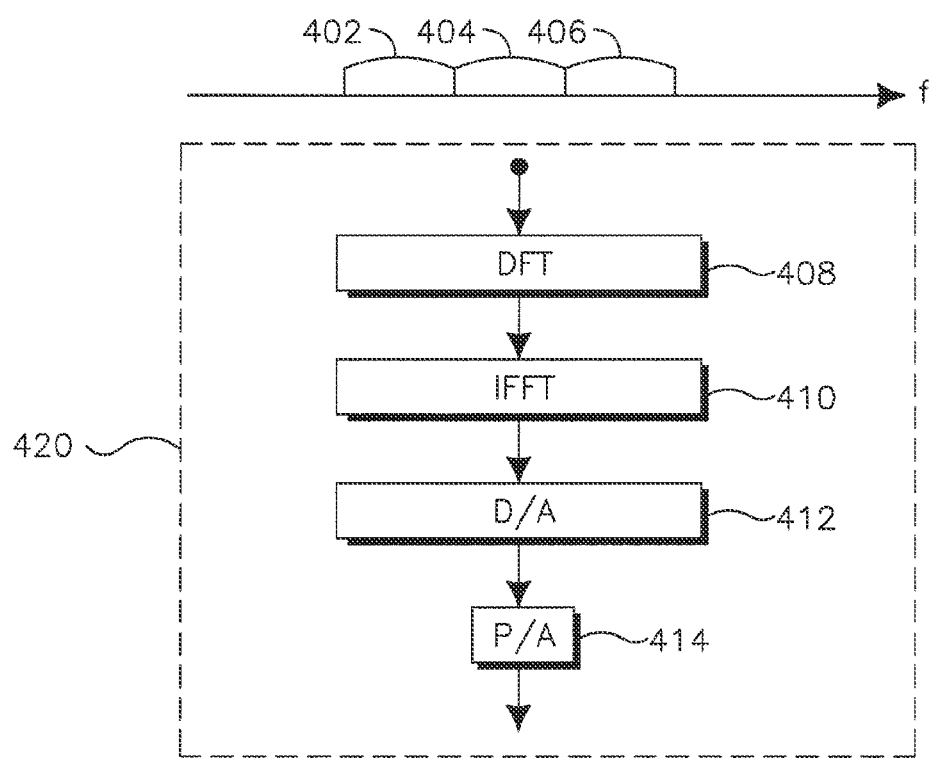
FIG. 4 shows an overview of a wireless communication system using carrier aggregation with contiguous carriers in accordance with an embodiment.

FIG. 4 shows an overview of carrier aggregation with contiguous carriers 400 in accordance with one embodiment. The individual carriers (402, 404, 406) may be aggregated to increase available bandwidth. Modulated data from each carrier (402, 404, 406) may be processed in a single WTRU 420 by a discrete Fourier transform (DFT) unit 408, an inverse fast Fourier transform (IFFT) unit 410, a digital to analog (D/A) converter unit 412 and a power amplifier (PA) unit 414.

Figure 5:
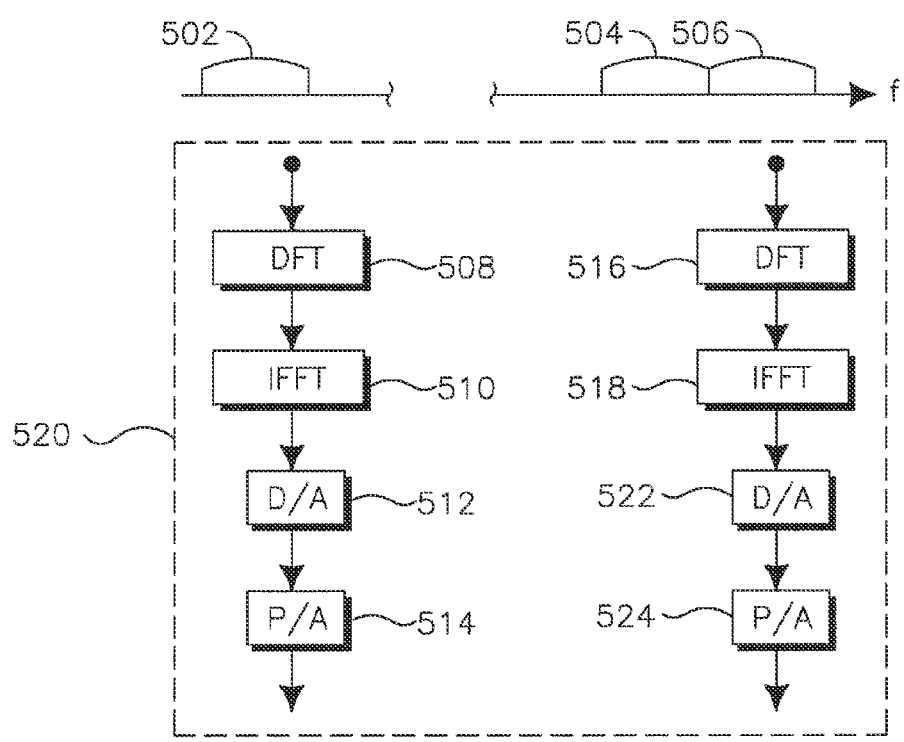
FIG. 5 shows an overview of a wireless communication system using carrier aggregation with non-contiguous carriers in accordance with another embodiment.

FIG. 5 shows an overview of carrier aggregation with non-continuous carriers 500 in accordance with another embodiment. As shown in FIG. 5, a first carrier 502 is separated in frequency from a second carrier 504 and a third carrier 506. The modulated data from each carrier 502, 504, 506 may be processed in a single WTRU 520. The data from the first carrier 502 may be processed in a DFT unit 508, an IFFT unit 510, a D/A unit 512 and PA unit 514. Similarly, the data from the second carrier 504 and the third carrier 506 may be processed by a DFT unit 516, an IFFT unit 518, a D/A unit 522, and a PA unit 524. Although shown as separate units in FIG. 5, each processing unit (508-524) may be combined into one or more combined processing units.

In a system using carrier aggregation, a WTRU may use a power control formula that is based on combined open loop and closed loop power control. In carrier aggregation, radio propagation conditions on each component carrier (CC) may be different, particularly with non-contiguous carrier aggregation (CA), as the radio propagation conditions, such as pathloss, for example, may be a function of the carrier frequency. In addition, interference levels on each CC may be different due to different traffic loads and propagation conditions. Furthermore, one transport block, for example, a hybrid automated retransmit request (HARQ) process, may be mapped to a single CC where each transport block may be processed independently, which implies that different adaptive modulation control (AMC) sets may be used for different transport blocks.

The WTRU can calculate its transmit power using an open-loop component, a closed loop component, and a bandwidth factor, all indexed to a physical uplink shared channel (PUSCH) subframe on a particular CC, as follows:

$$P_{PUSCH}(i,k)=\min\{P_{CMAX}(k), 10\log_{10}(M_{PUSCH}(i,k))+P_{O\_PUSCH}(j,k)+\alpha(j,k)\cdot PL(k)+\Delta_{TF}(i,k)+f(i,k)\} \quad \text{(Equation 1)},$$

where $P_{PUSCH}(i,k)$ is the WTRU transmit power, (typically in dBm) indexed to a PUSCH subframe (i) and an uplink (UL) CC(k) and $P_{CMAX}(k)$ is the CC-specific maximum WTRU transmit power on the UL CC(k). The parameter $P_{CMAX}(k)$ may be configured by the eNB. Alternatively, $P_{CMAX}(k)$ may be equal to $P_{CMAX}$ where $P_{CMAX}$ is the configured maximum WTRU transmitted power. For example, if the WTRU can support only a single UL CC, then $P_{CMAX}(k)$ may become Pcmax. The bandwidth factor ($M_{PUSCH}(i,k)$) is the number of allocated physical radio bearers (PRBs) and the open-loop component is $P_{O\_PUSCH}(j,k)+\alpha(j,k)*PL(k)$.

The open loop component includes $P_{O\_PUSCH}(j,k)$ which is the sum of a cell specific and CC specific nominal component $P_{O\_NOMINAL\_PUSCH}(j,k)$ and a WTRU specific and possibly CC specific component $P_{O\_WTRU\_PUSCH}(j,k)$ respectively. $P_{O\_NOMINAL\_PUSCH}(j,k)$ and $P_{O\_WTRU\_PUSCH}(j,k)$ may be signaled to the WTRU. In order to reduce the signaling overhead, the eNB may provide $P_{O\_NOMINAL\_PUSCH}(j,k)$ and $P_{O\_WTRU\_PUSCH}(j,k)$ for a reference UL CC, such as anchor CC, and provide corresponding offset values for other UL carriers where the individual offset values are relative to the reference UL CC's $P_{O\_NOMINAL\_PUSCH}(j,k)$ and $P_{O\_WTRU\_}^{PUSCH}(j,k)$.

The open-loop term $\alpha(j,k)$ is a cell specific and CC specific parameter, where $0 \le \alpha(j,k) \le 1$. The parameter "j" represents an UL transmission model. For example, j=0 for PUSCH transmissions corresponding to a semi-persistent grant, j=1 for PUSCH transmissions corresponding to a dynamic scheduled grant, and j=2 for PUSCH transmissions corresponding to the random access response. PL(k) is pathloss estimate for UL CC(k).

The open loop parameters, except for pathloss (PL), may be explicitly signalled to the WTRU. Some parameters may be CC specific and some parameters maybe CC group specific. The dimensions of a parameter may be CC or CC group specific. A WTRU with a number (L) of aggregated UL CCs may have a value for each CC, such as $P_{O\_WTRU\_PUSCH}(0)$, $P_{O\_WTRU\_PUSCH}(1)$, continuing to $P_{O\_WTRU\_PUSCH}(L-1)$, for example. Furthermore, rather than signaling absolute values of a CC specific or CC group specific parameter, a relative ($\Delta$) value can be used where the relative value may be relative to a value for a reference UL CC, such as an anchor UL CC, for example. Signaling relative values may reduce signaling overhead.

In the closed-loop component, $\Delta_{TF}(i,k)$ is the CC-specific modulation and coding scheme (MCS) offset, and $f(i,k)$ is a closed loop function. $\Delta_{TF}$ may be computed by:

$$\Delta_{TF}(i,k)=10\log_{10}((2^{MPR(i,k)\cdot K_s}-1)\beta_{offset}^{PUSCH}(k)) \quad \text{(Equation 2)}$$

where $K_S=1.25$ and $K_s=0$. $K_s$ may be signaled to the WTRU in a parameter, such as the deltaMCS-Enabled parameter, for example. Alternatively, $K_s$ may be CC-specific. The term $MPR(i,k)=O_{CQI}(i,k)/N_{RE}(i,k)$ for control data sent via PUSCH without the PUSCH data. Otherwise, $$MPR(i,k) = \sum_{r=0}^{C(i,k)-1} K_r(i,k)/N_{RE}(i,k).$$

The term C(i, k) is the number of code blocks in subframe i on UL CC(k), $K_r(i,k)$ is the size for code block r on UL CC(k), $O_{CQI}(i,k)$ is the number of feedback bits on UL CC(k) including cyclic redundancy check (CRC) bits and $N_{RE}(i,k)$ is the number of resource elements on UL CC(k). $N_{RE}(i,k)$ may be determined by $N_{RE}(i,k) = M_{sc}^{PUSCH-initial}(i,k) \cdot N_{symb}^{PUSCH-initial}(i,k)$. The parameter $\beta_{offset}^{PUSCH}(k) = \beta_{offset}^{CQI}$ for control data sent via the PUSCH on UL CC(k) without PUSCH data and 1 (one) otherwise.

The closed loop component for carrier aggregated UL power control may be CC specific. However, for a group of CCs such as contiguous CCs, or CCs sharing the same power amplifier, $f(i,k)$ may be common to each CC. If accumulated transmit power control (TPC) commands are used and accumulation is enabled based on the WTRU specific parameter accumulation-enabled, then:

$$f(i,k) = f(i-1,k) + \delta_{PUSCH}(i-K_{PUSCH}, k) \quad \text{(Equation 3)},$$

where $\delta_{PUSCH}(i-K_{PUSCH}, k)$ is a WTRU specific accumulation TPC command for UL CC(k). The TPC command may be signaled on the physical downlink control channel (PDCCH) with a particular downlink control information (DCI) format, such as format 0, 3/3A, or new or extended DCI format on subframe $(i-K_{PUSCH})$ where the value of $K_{PUSCH}$ is, for example, 4 for frequency domain duplex (FDD). For an absolute TPC command, if accumulation is not enabled based on the WTRU specific parameter accumulation-enabled, then:

$$f(i,k) = \delta_{PUSCH}(i-K_{PUSCH}, k) \quad \text{(Equation 4)},$$

where $\delta_{PUSCH}(i-K_{PUSCH}, k)$ is a WTRU specific absolute TPC command for UL CC(k) that was signaled on the PDCCH with a DCI format such as format 0, for example, or a new DCI format, on subframe $(i-K_{PUSCH})$. Alternatively, the TPC command $(\delta_{PUSCH})$ may be defined per group of CCs such as contiguous CCs or CCs sharing the same power amplifier (PA). For both accumulation and current absolute TPC commands, an initial value may be preset. If the $P_{O\_WTRU\_PUSCH}(k)$ value for UL CC(k) is changed by higher layers, then $f(i,k)=0$. Otherwise, $f(0,k) = \Delta P_{rampup} + \delta_{msg2}$ where $\Delta P_{rampup}$ is provided by higher layers and $\delta_{msg2}$ is the TPC command indicated in the random access response. $\Delta P_{rampup}$ and $\delta_{msg2}$ may be CC specific. Alternatively, a WTRU may reset accumulation for UL CC when the UL CC becomes active after an idle period and the idle period exceeds a predefined expiration time.

The physical random access channel (PRACH) may be transmitted by the WTRU over different UL CCs. PRACH transmission may also be hopped over different UL CCs. In addition, the accumulation reset of the function $f(i,k)$ may be performed on a CC basis. The function $f(i,k)$ may use accumulation or current absolute TPC commands, and may be carrier specific. For instance, the accumulation power adjustment function $f(*)$ may be applied by the WTRU to a first UL CC, while the absolute power adjustment function $f(*)$ is applied by the WTRU to a second UL CC. However, in order to reduce the relevant parameter signaling overhead and make the power control mechanism simpler, the WTRU specific parameter accumulation-enabled may be common to all the CCs aggregated for a given WTRU.

If the WTRU is receiving an accumulated TPC command transmission and the WTRU has reached maximum power, positive TPC commands may not be accumulated to the respective corresponding accumulation function, $f(i,k)$ for the UL CC receiving a positive TPC command. However, if the WTRU has reached minimum power, negative TPC commands may not be accumulated to the respective corresponding accumulation function, $f(i,k)$ for UL CCs receiving a negative TPC command.

The power control for PUCCH may be CC specific as follows:

$$P_{PUCCH}(i,k) = \min\{P_{CMAX}(k), P_{O\_PUCCH}(k) + PL(k) + h(n_{CQI}, n_{HARQ}, k) + \Delta_{F\_PUCCH}(F) + g(i,k)\} \quad \text{(Equation 5)},$$

where $P_{PUCCH}(i,k)$ is the WTRU transmit power, typically in dBm, for PUCCH in subframe i on CC(k) where k is the index of the UL CC. As in Equation 1, $P_{CMAX}(k)$ is the CC-specific maximum WTRU transmit power on UL CC(k), where $P_{CMAX}(k)$ may be configured by the eNB. Alternatively, $P_{CMAX}(k)$ may be equal to $P_{CMAX}$ where $P_{CMAX}$ is the configured maximum WTRU transmitted power. For example, if the WTRU can support only a single UL CC, then $P_{CMAX}(k)$ may become $P_{CMAX}$. $P_{O\_PUCCH}(k)$ is a CC specific parameter composed of the sum of a cell specific and CC specific nominal component $P_{O\_NOMINAL\_PUCCH}(k)$ and a WTRU specific and possibly CC specific component $P_{O\_WTRU\_PUCCH}(k)$ where k represents the UL CC index. $P_{O\_NOMINAL\_PUCCH}(k)$ and $P_{O\_WTRU\_PUCCH}(k)$ are provided by higher layers. In order to reduce the signaling overhead, the eNB may provide $P_{O\_NOMINAL\_PUCCH}(k)$ and $P_{O\_WTRU\_PUCCH}(k)$ for a reference UL CC, such as anchor UL CC, and provide corresponding offset values for other UL carriers where the individual offset values are relative to the reference UL CC's $P_{O\_NOMINAL\_PUCCH}(k)$ and $P_{O\_WTRU\_PUCCH}(k)$, respectively.

The term $h(n_{CQI}, n_{HARQ}, k)$ is a PUCCH format dependent value when a PUCCH is transmitted on CC(k). The index of k in $h(n_{CQI}, n_{HARQ}, k)$ may be dropped, if all PUCCHs are transmitted only on a single UL CC, for example. The parameter $\Delta_{F\_PUCCH}(F)$ is provided by higher layers. Each $\Delta_{F\_PUCCH}(F)$ value corresponds to a PUCCH format (F) relative to another PUCCH format, such as format 1a. The term $\Delta_{F\_PUCCH}(F)$ may be CC specific. The function $g(i, k)$ is the current PUCCH power control adjustment function as a function of a WTRU specific and CC specific TPC command $\delta_{PUCCH}(i, k)$ as shown in the equation:

$$g(i, k) = g(i-1, k) + \sum_{m=0}^{M-1} \delta_{PUCCH}(i-k_m, k). \quad \text{(Equation 6)}$$

Similar to the power control equation for the PUSCH, the function $\delta_{PUCCH}(i,k)$ for UL CC may be included in a PDCCH with a DCI format, such as format 1A/1B/1D/1/2A/2 or sent jointly coded with other WTRU specific PUCCH correction values on a PDCCH with a DCI format, such as format 3/3A, whose CRC parity bits are scrambled with a radio network temporary identifier (RNTI). The RNTI may be PUCCH specific and TPC or CC specific.

In non-contiguous UL CA, the PUSCH and/or PUCCH transmission may be switched from one UL CC to another UL CC, for example, due to carrier dependent scheduling and carrier hopping. In this case, the closed loop power control adjustment state function, $f(i,k)$, for PUSCH and $g(i, k)$ for PUCCH on UL CC(k), may not be valid for other UL CCs, because different CCs may experience different interference conditions and pathloss measurements.

If accumulation is enabled such that $f(i,k) = f(i-1,k) + \delta_{PUSCH}(i-K_{PUSCH}, k)$, the WTRU may reset accumulation such that $f(i,k) = 0$ if PUSCH transmission is switched from one CC to another CC. Similarly, the WTRU may reset accumulation such that $g(i,k) = 0$ if PUCCH transmission is switched from one CC to another CC.

Alternatively, after the CCs are switched, $f(i,k)=f(i-1,k)+\Delta_{PL}$ where $f(i-1,k)$ is the last power control adjustment state used before the switch. The term $\Delta_{PL}$ is the pathloss difference estimate between the CCs before and after the switch.

During a random access procedure, an initial value of $f(0,k)$ may be set to $f(0,k)=\Delta P_{rampup}+\delta_{msg2}$ until the WTRU gets a value for the $P_{O\_UE\_PUSCE}$ term from higher layer signaling after a radio resource control (RRC) connection. The function $f(0,k)=\Delta P_{rampup}+\delta_{msg2}$ can be used, for example, for the transmission of a random access message in a random access procedure because the WTRU may not have established the RRC connection yet. The WTRU may start the random access attempt in one UL CC, and, after receiving a random access response message, switch to another UL CC. The WTRU may have information regarding the value of $f(0,k)=\Delta P_{rampup}+\delta_{msg2}$ for the UL CC on which it initiated the random access and received the message. To determine the power for other UL CCs, the WTRU can use the same $f(0,k)=\Delta P_{rampup}+\delta_{msg2}$ value determined for the first UL CC and add an offset to compensate for differences between the UL CCs, such as interference. Alternatively, the WTRU can set the $f(0,k)$ to zero (0).

In order to determine a pathloss estimate for an UL CC, pathloss measurements may be performed by a WTRU on at least one, and as many as all of the downlink (DL) CCs. A pathloss measurement for each UL CC may be used. Alternatively, each DL carrier may be mapped to, or paired with an UL carrier for pathloss measurement. The pairings may be configured on a one-to-one basis or the CCs may be grouped together before pairing. For example, contiguous CCs with the same carrier frequency or within a same frequency/spectrum band may be grouped together. The pathloss measurement association and/or configuration that indicates which DL CCs are used for the pathloss estimation for power control of each UL CC may be configured and signaled to the WTRU in a message from a higher layer entity, such as the RRC. That is, the DL CC used for pathloss estimation/derivation for power control of each UL CC may be configured per WTRU by the network. Alternatively, the pathloss measurement association and/or configuration may be signaled per group of WTRUs or to all the WTRUs within a cell using a system information block (SIB), for example. If the CCs are contiguous, it may not be necessary to carry out pathloss measurements on each contiguous CC, as the pathloss measurements may be similar to each other.

An association or mapping rule can be used by the WTRU to associate DL CCs in which pathloss measurements are made with UL CCs on which the pathloss measurements are applied. For example, the WTRU may associate the pathloss measured on a DL CC with an UL CC that has a similar center or band frequency.

Alternatively, since pathloss is a function of carrier frequency, pathloss differences between multiple CCs or bands can be calculated as a function of the carrier frequency for a given radio channel condition, radio channel model and/or radio channel environment between a WTRU and an eNB. A WTRU may conduct pathloss measurements on a reference DL CC, such as on an anchor DL CC, for example. The measured pathloss can be applied by the WTRU to the UL CC associated with a reference DL CC, while pathloss estimates may be made by the WTRU for other UL CCs using measured pathloss levels as follows:

$$PL(k)=PL_{mes}(k_f)+\Delta_{PL}(k)(\text{dB}) \qquad \text{(Equation 7)},$$

where $k_f$ is the reference DL CC and $PL_{mes}(k_f)$ is the pathloss measured on DL CC$(k)_f$. The term $\Delta_{PL}(k)$ represents the pathloss offset for UL CC(k) where $\Delta_{PL}(k)$ may be determined by the WTRU, for example, as a function of the center carrier frequencies of the reference CC$(k)_f$ and UL CC(k), respectively.

Alternatively, $\Delta_{PL}(k)$ may be signaled from the network. $\Delta_{PL}(k)$ may be included in the open loop parameter, $P_{O\_PUSCH}(j,k)$ and/or $P_{O\_PUCCH}(k)$. More specifically, $\Delta_{PL}(k)$ may be included in the $P_{O\_NOMINAL\_PUSCH}(j,k)$ term or the $P_{O\_WTRU\_PUSCH}(j,k)$ term for PUSCH and the $P_{O\_NOMINAL\_PUCCH}(k)$ term or the $P_{O\_WTRU\_PUCCH}(k)$ term for PUCCH by, for example, expanding the current range of $P_{O\_PUSCH}(j,k)$, $P_{O\_NOMINAL\_PUSCH}(j,k)$, $P_{O\_WTRU\_PUSCH}(j,k)$, $P_{O\_PUCCH}(k)$, $P_{O\_NOMINAL\_PUCCH}(k)$ or $P_{O\_WTRU\_PUCCH}(k)$. Alternatively, $\Delta_{PL}(k)$ may be signaled to the WTRU and a CC specific power control parameter may be used to signify the term.

Pathloss may be defined as:

$$PL=(\text{referenceSignalPower})-(\text{higher layer filtered RSRP}) \qquad \text{(Equation 8)},$$

where referenceSignalPower is a parameter provided to the WTRU and RSRP is the reference signal received power. An eNB may allocate different cell-specific reference signal (CRS) transmit power levels on different DL CCs for purposes such as traffic load control or interference management, for example. The individual reference transmit power may be signaled to the WTRU. Alternatively, in order to reduce signaling overhead, the eNB may provide the CRS transmit power for a reference DL CC, such as anchor CC, and provide relative CRS power offsets for other DL CCs where the CRS power offsets are relative to the reference DL CC CRS power. Rather than separately signaling the CRS power offsets, the individual CC power offsets may be included in corresponding $P_{O\_PUSCH}(j,k)$ for PUSCH or $P_{O\_PUCCH}(k)$ for PUCCH. More specifically, the CRS power offsets may be included in the $P_{O\_NOMINAL\_PUSCH}(j,k)$ term or the $P_{O\_NOMINAL\_PUCCH}(k)$ term.

One DL reference CC may provide the CRS to derive the pathloss. The WTRU may make the pathloss measurement based on the CRS and then make corrections based on frequency differences between each UL carrier and the frequency of the DL reference CC. The network may assign a DL carrier to be used as the DL reference. This method may be suitable for contiguous UL transmissions and non-contiguous transmissions, provided accurate corrections can be derived or determined.

Multiple DL reference CCs may be used. The DL reference CCs may be configured by the eNB. The WTRU may make measurements on the reference CCs and follow an algorithm to map these measurements into an open loop estimate for each of the UL CCs. If appropriate, the WTRU may make frequency-dependent corrections. This may be most suitable for noncontiguous operation where it may be necessary to deal with significant separation of the UL CCs. It also may provide sufficient performance benefit to also apply to contiguous operation.

The network may select a single CC for the reference signal based on the CC that provides the most representative frequency. For example, the DL CC that has the least frequency separation from the UL CC may be used for uplink power control, the anchor carrier may be used or the DL CC that has the largest pathloss may be used.

Alternatively, a combination of the measured pathloss of more than one DL CC can be used for UL power control. Criteria for selecting the CCs to be used may include choosing the CCs with a frequency that is separated from the uplink carrier frequency by less than a particular threshold.

The threshold may be preconfigured or may be derived by the WTRU. Other criteria that may be used to select the CCs may include excluding CC carriers that are non-contiguously aggregated with the DL carrier and have the smallest frequency separation from the UL CC. The combination of CCs may be a linear combination or a weighted average of combined CCs.

If the frequency separation between DL and UL CCs is more than a predetermined threshold, a correction term for pathloss may be applied by the WTRU. Alternatively a correction term for pathloss for UL power control may be applied regardless of the threshold being exceeded. Precise pathloss may be required due to several factors, such as the radio channel conditions, for example.

Measured pathloss estimates can be combined by the WTRU using an averaging or filtering technique. Weights can be assigned to different measurements. For example, the pathloss of the DL CC which has the smallest frequency separation from the UL CC might have a relatively larger weight. The weight might be configured by the eNB and signaled to the WTRU.

When there are multiple DL CCs available for pathloss measurement, the eNB may use different CRS transmit powers on the DL CCs. The individual CRS transmit powers may be transmitted to the WTRU by higher layer signaling. Alternatively, the eNB may provide the CRS transmit power for a reference DL CC, such as an anchor CC, for example, and relative CRS transmit powers or power offsets for other DL CCs where the relative CRS transmit powers are relative to the reference DL CC's CRS transmit power. The WTRU may perform the RSRP measurement on the reference DL CC and calculate the PL on other DL CC, for example, DL CC(n) as:

$$PL(n) = (\text{referenceSignalPower}) - (\text{higher layer filtered RSRP}) + P_{\textit{offset}}(n) \quad \text{(Equation 9)},$$

where $P_{\textit{offset}}(n)$ is the relative CRC power or power offset for DL(n).

Aggregated UL carriers may experience disparate pathloss metrics. For example, pathloss is a function of carrier frequency and the type of cell deployment. A WTRU in a macro cell may experience a different pathloss than in a micro cell. The pathloss of an UL CC can be measured by the WTRU and the other pathloss of other CCs can be computed from the measurement.

In order to determine pathloss, the WTRU may choose an UL CC as a reference CC. The reference CC may be the one with the lowest carrier frequency, the highest carrier frequency or middle carrier frequency. Alternatively, the eNB may signal the WTRU which UL CC the WTRU should consider as reference CC.

The WTRU measures the pathloss in a DL CC. The resulting pathloss may be used for the transmit power setting for the UL reference CC. For other UL CCs, the WTRU calculates the relative pathloss, that is, the pathloss offset, between the reference UL CC and other UL CCs according to the pathloss formula on each CC, and applies the pathloss offset for the other CC.

Due to potentially different propagation law or environments, the pathloss formula on each CC might be different. Therefore, for two non-contiguous CCs, a reference CC and a CC(i), with carrier frequency $f_{\textit{ref}}$ and $f_i$ respectively, the pathloss formulas are:

$$PL_{\textit{ref}} = C_{\textit{ref}} + 10 n_{\textit{ref}} \log 10(D) + 10 m_{\textit{ref}} \log 10 f_{\textit{ref}} \quad \text{(Equation 10)},$$

and $$PL_i = C_i + 10 n_i \log 10(D) + 10 m_i \log 10(f_i) \quad \text{(Equation 11)},$$

where D is the distance from transmitter to receiver. The relative pathloss, $\Delta_{PL}$ between the reference CC and other CC can be derived as:

$$\Delta_{PL}(i) = C_{\textit{ref}} - C_i + 10(n_{\textit{ref}} - n_i) \log 10(D) + 10 m_{\textit{ref}} \log 10(f_{\textit{ref}}) - 10 m_i \log 10(f_i) \quad \text{(Equation 12)}$$

A correction term may be applied to the pathloss offset calculation to account for different channel models in Equation 11, as follows:

$$\Delta_{PL}(i) = C_{\textit{ref}} - C_i + 10(n_{\textit{ref}} - n_i) \log 10(D) + 10 m_{\textit{ref}} \log 10(f_{\textit{ref}}) - 10 m_i \log 10(f_i) + \text{corr\_term} \quad \text{(Equation 13)},$$

where corr_term is the correction term for pathloss offset. The term corr_term may be configured or signaled by network. The values of corr_term can be in the form of lookup table.

For example, where two CCs follow the same pathloss, for a particular channel model, the pathloss may be calculated as $PL = 58.83 + 37.6 \log 10(D) + 21 \log 10(f_c)$, where D is the distance from transmitter to receiver and $f_c$ is the reference CC frequency. Then the relative pathloss, $\Delta_{PL}$ between the reference CC and other CCs is:

$$\Delta_{PL}(i) = 21 \log 10(f_c) - 21 \log 10(f_o) = 21 \log 10\left(\frac{f_c}{f_o}\right) + \text{corr\_term}$$

where $f_o$ is the other carrier frequency.

The radio channel propagation model may be known to the network. Rather than use a fixed propagation exponent, such as 21, the value may be a cell-specific parameter signaled by the network. For example, the exponent may take the values such as 21, 30, 35, 40, for example, using 2 signaling bits.

Alternatively, the eNB may transmit the pathloss offsets for the other UL CCs to the WTRU. The eNB can determine the offsets based on a measurement of uplink sound reference signals (SRS) on different UL CCs. The CC specific offset may be included in the open loop parameter, $P_{o\_PUSCH}$ for PUSCH and $P_{o\_PUCCH}$ for PUCCH. In particular, as channel conditions may be different for different WTRUs, the CC specific offset may be included in the WTRU specific component $P_{o\_WTRU\_PUSCH}$ for PUSCH and $P_{o\_WTRU\_PUCCH}$ for PUCCH. Alternatively, the eNB may base the offsets on a measurement of a reference signal. The eNB may inform the WTRU about the recommended correction term for each of the uplink CCs.

Figure 6:
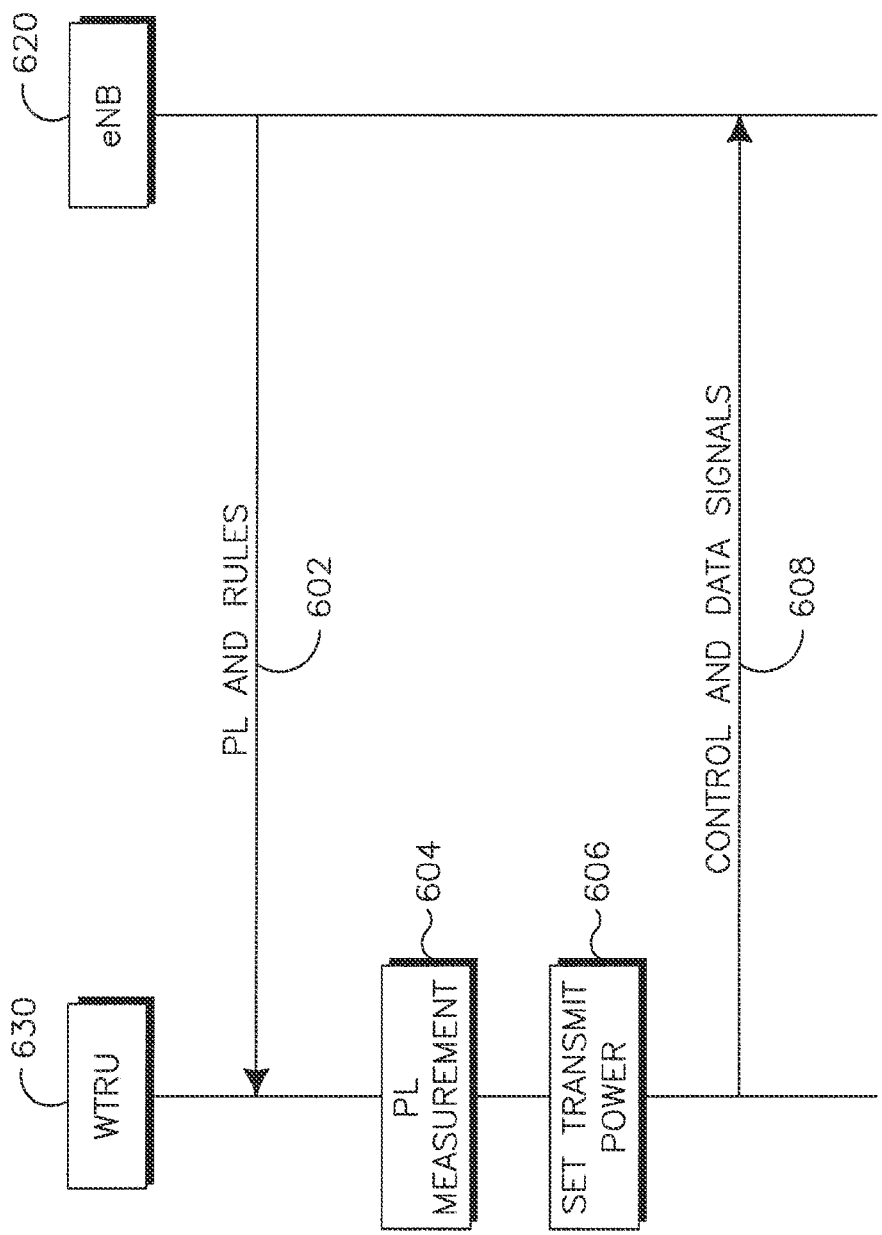
FIG. 6 is a signal diagram for a method of power control in accordance with an embodiment.

FIG. 6 is a signal diagram for a method of power control 600 in accordance with an embodiment. At 602, the eNB 620 signals a pathloss measurement, such as DL CRS, and pathloss setting rules to the WTRU 630. The pathloss setting rules may include, for example, the UL reference CC, DL reference CC, UL/DL CC pairing information, and pathloss offset between CCs, if any.

At 604, the WTRU 630 performs pathloss measurements on aggregated CCs according to the pathloss measurement and setting rules. At 606, the WTRU 630 uses measured pathloss to set transmit power for uplink transmission on aggregated CCs, and calculates power headroom for aggregated CCs. At 608, the WTRU 630 transmits UL signals to the eNB 620 using the calculated power settings.

As shown in Equation (1) and (5), respectively, separate TPC commands may be used for PUSCH and PUCCH, respectively. For example, separate TPC commands may be transmitted from the eNB to the WTRU for PUSCH and PUCCH power control, respectively. For PUSCH power control, the TPC command may be defined per UL CC and per WTRU. For PUCCH power control, the TPC command may be defined per UL CC and per WTRU. If the WTRU is transmitting multiple PUCCHs on a UL CC, separate TPC commands for the individual PUCCHs may be received by the WTRU. Upon receiving the TPC commands, the WTRU may apply each of them for the associated PUCCH.

Alternatively, the TPC command for PUSCH or PUCCH may be defined per group of UL CCs or for all UL CCs. The eNB may configure the WTRU through higher layer signaling to inform the WTRU whether the TPC command is defined per CC, per group of CCs, or all CCs. For example, a TPC command may be configured to control a group of UL CCs where the CCs are transmitted using the same PA.

TPC commands for the PUSCH in a carrier aggregated system may be received by the WTRU in the PDCCH with a particular DCI format, such as DCI format 0 or DCI format 3/3A. The DCI format may include PUSCH power control for a carrier aggregated system. Similarly, TPC commands for the PUCCH can be received in the WTRU with a particular format such as DCI format 1A/1B/1D/1/2A/2 or DCI format 3/3A, where the respective format may facilitate PUCCH power control in a carrier aggregated system.

Each unit of control data may have a CRC. The CRC may be scrambled with an radio network temporary identifier (RNTI). The RNTI may be WTRU specific, group specific, or function specific, for example, TPC. Each WTRU looks for the RNTIs that would indicate that there is control information for that WTRU. The WTRU may look for an RNTI that is WTRU specific, CC specific, PUSCH specific, TPC specific, PUCCH specific or any combination of WTRU, CC, PUSCH, PUCCH and TPC.

A PDCCH carrying a CC-specific TPC command may have an RNTI where CRC bits of the PDCCH are scrambled with the RNTI. The RNTI may be UL CC-specific. For example, a PDCCH with DCI format 0 or DCI format 1A/1B/1/2A/2, for example, may have the C-RNTI, SPS-CRNTI or UL CC-specific C-RNTI of the WTRU. A PDCCH with DCI format 3/3A for PUSCH may have the TPC-PUSCH-RNTI or UL CC-specific TPC-PUSCH-RNTI of the WTRU and a PDCCH with DCI format 3/3A for PUCCH may have the TPC-PUCCH-RNTI or UL CC-specific TPC-PUCCH-RNTI of the WTRU.

The WTRU can receive multiple DCI formats including, for example, DCI format 0/1/2/3/3A, in the same subframe. As the TPC command is carried in the PDCCH, the TPC command signaling method may depend on the PDCCH structure. For example, when TPC commands for a WTRU are included in a PDCCH with a DCI format such as DCI format 3/3A, the TPC command may be jointly coded with other TPC commands for other WTRUs and other CCs.

When a TPC command for PUSCH is included in the PDCCH with a particular DCI format, such as DCI format 0, and the TPC command is in an UL grant, the TPC command may be applied by the WTRU to a particular UL CC. The TPC command in an UL grant for a given WTRU may be associated with an UL CC. The WTRU may receive information about the associated UL CC from the eNB or it may determine the association using a preconfigured mapping or rule. For example, a TPC command in the PDCCH with an UL grant may be applied by the WTRU to the UL CC for which the UL grant applies.

The association of the PDCCH with an UL grant and UL CC can be transmitted to the WTRU by use of an indicator such as a layer one (L1) explicit indicator, an implicit UL CC indicator or in RRC signaling, for example. If an explicit L1 CC indicator in the PDCCH is used so that the WTRU knows which TPC commands applies to each UL CC, then the structure of the DCI format may accommodate the L1 CC indicator. For an implicit CC indicator, a WTRU's UL CC-specific C-RNTI can be used such that for a UL CC, the corresponding WTRU's UL CC-specific C-RNTI is scrambled with CRC bits of the PDCCH.

Alternatively, at least a group of TPC commands, and as many as all TPC commands for the PUSCH may be carried in a single UL grant. An index for a TPC command to UL CC mapping can be used so that the WTRU knows which TPC bits apply to each UL CC. Alternatively, an association of TPC commands and UL CC identification or index may be established through higher layer signaling or may follow one or more rules implemented in the WTRU. Accordingly, the WTRU may use preconfigured rules to determine which commands corresponds to each UL CC.

When a TPC command for the PUSCH is included in a first PDCCH with a particular format, such as DCI format 3/3A for example, a CC specific or CC group specific TPC command for a given WTRU may be jointly coded with other CC specific or CC group specific TPC commands for other WTRUs. The CRC parity bits may be scrambled with a TPC-PUSCH-RNTI or a CC-TPC-PUSCH-RNTI. The CC-TPC-PUSCH-RNTI may be a UL CC-specific TPC-PUSCH-RNTI. Another CC-specific TPC command for the WTRU may be transmitted on another associated PDCCH using a CC-TPC-PUSCH-RNTI that is different than the one used in the first PDCCH. For example, the TPC command for a first UL CC of a first WTRU may be jointly coded with the first UL CC TPC commands for a second and a third WTRU. The TPC commands may be transmitted in the PDCCH with a particular DCI format, such as format 3/3A, for example. The first, second and third WTRUs may have the same TPC-USCH-RNTI or k-th CC-TPC-PUSCH-RNTI. If the first WTRU has another active UL CC, for example, a second CC, then the corresponding TPC command may be jointly coded with the second UL CC TPC commands for other WTRUs. The TPC commands for each WTRU may be coded using different TPC-PUSCH-RNTIs or CC-TPC-PUSCH-RNTIs. Each location of the CC-specific TPC bits for each WTRU within the PDCCH may be signaled to the WTRU via higher layer signaling. While this example includes three WTRUs, the number of WTRUs is for example only, any number of WTRUs may use the method disclosed herein.

The WTRU may receive information such as the TPC parameter and the TPC index. For example, the TPC parameter may indicate how to allocate TPC bits to each WTRU and each CC. The TPC index may be CC-specific per WTRU or common to all CCs per WTRU.

Alternatively, all the CC-specific TPC commands for all active UL CCs for a first WTRU may be jointly coded with CC-specific TPC commands for a second and a third WTRU in a PDCCH with a particular DCI format, such as DCI format 3/3A or extended DCI format 3/3A, for example. The CRC parity bits may be scrambled with a TPC-PUSCH-RNTI. Each location of the respective CC-specific TPC command bits for the first WTRU may be signaled to the WTRU via higher layer signaling. Included in the location information may be the TPC parameter and the TPC index.

The TPC-index may be defined for each WTRU. The information regarding which TPC bit corresponds to which CC may be signaled to the WTRU explicitly by higher layers. Alternatively, the WTRU may determine the correspondence implicitly by using a preconfigured rule or mapping. With the implicit signalling, the CC specific TPC bits for a WTRU may be placed in ascending order with the UL CC index and the WTRU may receive information as to where to starting reading the TPC bits within the PDCCH it receives from the eNB using, for example, higher layer signalling.

For CC-specific or CC group-specific TPC command transmission for PUSCH, the WTRU may attempt to decode a PDCCH of a first DCI format, such as DCI format 0, for each UL CC on the associated DL CC using an identifier, such as a WTRU's C-RNTI, a WTRU's CC specific C-RNTI, an SPS C-RNTI, or a CC specific SPS C-RNTI, for example, in every subframe except when the WTRU is in DRX mode or in a measurement gap. At the same time, the WTRU may also attempt to decode a PDCCH of a second DCI format, such as DCI format 3/3A, for each UL CC, using a different identifier such as TPC-PUSCH-RNTI or CC-TPC-PUSCH-RNTI, in every subframe except when in the WTRU is in DRX mode or in a measurement gap. If accumulation TPC commands for the UL CC(k) are transmitted, the closed loop PC adjustment function, $f(i,k)$ may be equal to $f(i-1, k) + \delta_{PUSCH}(i-K_{PUSCH}, k)$ where $\delta_{PUSCH}(i-K_{PUSCH}, k) = 0$ dB for the $(i-K_{PUSCH})^{th}$ subframe where no TPC command is decoded, where the WTRU is in DRX mode or where a measurement gap occurs on the associated DL CC. If absolute TPC commands for the UL CC(k) are transmitted, $f(i,k) = \delta_{PUSCH}(i-K_{PUSCH}, k)$. The function $f(i, k) = f(i-1, k)$ for a subframe where no TPC command is decoded for the UL CC, where the WTRU is in DRX mode, or where a measurement gap occurs on the associated DL CC. This may also occur if CC group specific TPC commands are transmitted. For a given UL CC, if a first DCI format, such as DCI format 0 and a second DCI format, such as DCI format 3/3A are both detected in the same subframe, the WTRU may use the TPC command, $\delta_{PUSCH}(i, k)$, provided in the first DCI format.

When a TPC command for PUCCH is included in PDCCH with a DCI format such as DCI format 1A/1B/1D/1/2A/2, for example, the DL grant and scheduling information may be included in the PDCCH as well. The TPC command may be applied by the appropriate WTRU to control PUCCH transmit power on a particular UL CC. The TPC command may be applied to the UL CC associated with each DL grant or each bit of scheduling information for a given WTRU. The WTRU may receive information about the associated UL CC from the eNB or it may determine the association using a preconfigured mapping or rule. For example, a TPC command carried in the PDCCH with DL grant or scheduling information and using a particular DCI format, such as DCI format 1A/1B/1D/1/2A/2, for example, may be applied to an UL CC on which an ACK/NACK is transmitted. The ACK/NACK may be associated with the DL grant and scheduling information in the PDCCH. The association of the PDCCH with the DL grant and UL CC can be given to the WTRU by using, for example, an explicit L1 CC indicator within the PDCCH, an implicit UL CC indicator or by RRC signaling.

If an explicit L1 CC indicator is used within the PDCCH, the WTRU may know which TPC commands apply to each UL CC. The structure of the DCI format may accommodate the L1 CC indicator.

If an implicit UL CC indicator is used, the WTRU's UL CC-specific C-RNTI can be used such that, for an UL CC, the corresponding WTRU's UL CC-specific C-RNTI may be scrambled with CRC bits of the PDCCH. Alternatively, at least a subset, and as many as all, the TPC commands for PUCCH may be carried in a DL grant or scheduling information message. An index for a TPC command to UL CC mapping can be used so that the WTRU knows which TPC bits apply to each UL CC. Alternatively, an association of TPC commands and UL CC identification may be established through higher layer signaling or may follow one or more rules implemented in the WTRU. The WTRU may use preconfigured rules to determine which commands corresponds to each UL CC.

At least a group, or as many as all TPC commands for a given PUCCH for a given WTRU may be bundled together. The resulting bundle of TPC commands may be carried in a PDCCH such as a DL reference CC. The bundle may also be carried in multiple PDCCHs with a particular DCI format, such as DCI format 1A/1B/1D/1/2A/2 or DCI format 3/3A. The TPC command may be applied to a group, or as many as all UL CCs.

Alternatively, $\delta_{PUCCH}$ may be WTRU specific, but not CC specific when it is signalled on a PDCCH. The term $\delta_{PUCCH}$ may be carried on a DL reference CC where a single $\delta_{PUCCH}$ value controls the PUCCH power. Table 1 shows examples of TPC signaling in an UL grant.

TABLE 1

| | TPC SIGNALING | | |
|---|---|---|---|
| | One UL GRANT per UL carrier | One UL GRANT for all UL carriers | One UL GRANT per group of UL carriers |
| One TPC per UL carrier | Separate or joint TPC signaling can be applied. For separate TPC signaling, the UL GRANT carrying TPC is decoded by the WTRU in predetermined DL carriers, or assigned DL carriers that are signaled, or configured DL carriers by blind decoding all the carriers. For joint TPC signaling, the index of the UL GRANT carrying TPC is known by the WTRU from the preconfigured | Joint TPC signaling is applied and there is one UL GRANT carrying TPC. This UL GRANT WTRU is decoded by the WTRU to obtain the TPC. | Group or joint TPC signaling. For group TPC signaling, several TPC commands for UL carriers scheduled by the same PDCCH are signaled on each UL scheduling grant. For joint TPC signaling, the index of UL GRANT carrying TPC is known by Preconfigured DL carrier index (that carries the single TPC) Assigned DL carrier index that is signaled, |

TABLE 1-continued

TPC SIGNALING

| | One UL GRANT per UL carrier | One UL GRANT for all UL carriers | One UL GRANT per group of UL carriers |
|---|---|---|---|
| One TPC per a subset or group of UL carriers | Separate or joint TPC signaling. For both methods, the index of the UL GRANT carrying TPC is known by the WTRU from the preconfigured DL carrier index (that carries the single TPC), or the assigned DL carrier index that is signaled, or a different UL scheduling grant format (one not carrying TPC) | Joint TPC signaling is applied and there is one UL GRANT carrying TPC. This UL GRANT WTRU is decoded by the WTRU to obtain the TPC. | Group or joint TPC signaling. For group TPC signaling, several TPC commands for UL carriers scheduled by the same PDCCH are signaled on each UL scheduling grant. For joint TPC signaling, the index of UL GRANT carrying TPC is known by Preconfigured DL carrier index (that carries the single TPC) Assigned DL carrier index that is signaled, Different UL scheduling grant format (other than those does not carry TPC) |
| One TPC for all UL carriers | The only TPC command is carried in one UL GRANT, whose index is known by the WTRU from the preconfigured DL carrier index (that carries the single TPC), or an assigned DL carrier index that is signaled, or a different UL scheduling grant format (one not carrying TPC) | The only TPC command is carried on the only UL GRANT. This UL GRANT WTRU is decoded by the WTRU to obtain the TPC. | The only TPC command is carried in one UL GRANT, whose index is known Preconfigured DL carrier index (that carries the single TPC) Assigned DL carrier index that is signaled, Different UL scheduling grant format (other than those does not carry TPC) |

Figure 7:
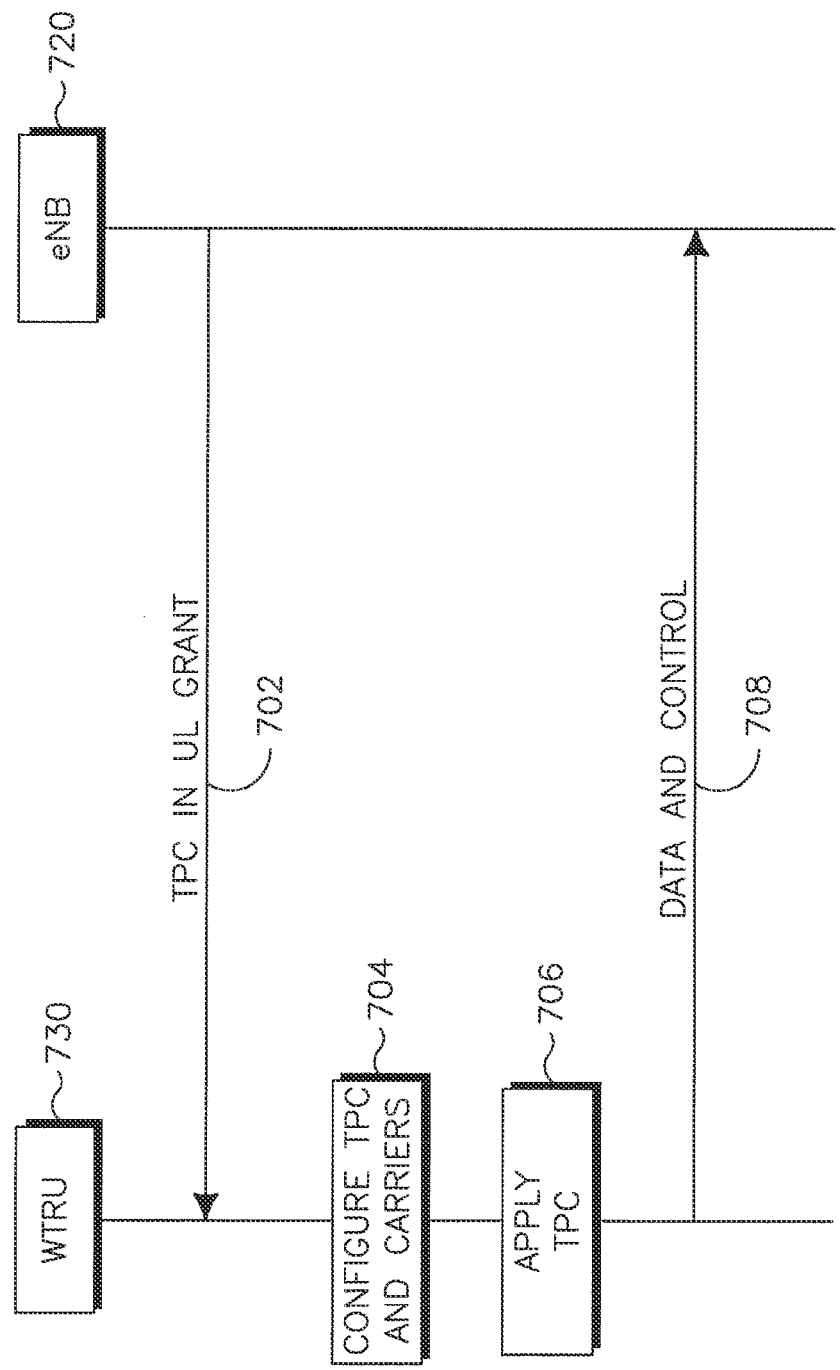
FIG. 7 is signal diagram showing a power control method in accordance with another embodiment.

FIG. 7 is a signal diagram showing a power control method 700 in accordance with another embodiment. At 702 the eNB 720 signals the TPC to the WTRU 730 in accordance with the methods described herein. The TPC is transmitted in an UL grant with DCI format 0. At 704, upon receiving the UL grant and the TPC from the network, the WTRU 730 determines the association between the TPC and its corresponding carriers according to the appropriate rule taken from Table 1, or as otherwise described herein. At 706 the WTRU applies the received TPC to set transmit power for uplink transmission on aggregated carriers accordingly. At 708, the WTRU 730 transmits an uplink signal with the received TPC applied.

Rather than being be CC specific, a TPC command may be defined for a group of UL CCs or for all UL CCs. The eNB may configure the WTRU through, for example, higher layer signalling, so that the WTRU may recognize whether the TPC command is defined per CC, per group of CCs, or for the entire UL. For example, a TPC command may be configured to control a group of UL CCs where the CCs are transmitted using the same PA in the WTRU. Contiguous CCs may share the same PA at the WTRU. The WTRU and the eNB may exchange configuration information regarding how the WTRU associates CCs with each PA. The exchange of configuration information may be done via higher layer signalling. If TPC transmission is per CC or per group of CCs, an association or mapping between the TPC command and the applied UL CCs may be preconfigured and provided to the WTRU via, for example, higher layer signalling.

A single TPC command may be used for PUCCH power control per CC. The TPC command may be transmitted on an associated DL CC, and the parameters h ($n_{CQI}$, $n_{CQI}$,k) and $\Delta_{F\_PUCCH}(F)$, may be applied per PUCCH.

Multiple PUCCHs may be simultaneously transmitted from a WTRU on a CC or multiple CCs. For example, a WTRU may transmit one or more acknowledge/non-acknowledge (ACK/NACK) signals in a first PUCCH and other feedback, such as a channel quality indicator (CQI) or a precoding matrix indicator (PMI) in a second PUCCH on the same CC in a subframe. The power settings for each respective PUCCH may be implemented separately, using Equation 5. If more than one PUCCH are simultaneously transmitted from a WTRU on a UL CC, then separate TPC commands for the individual PUCCHs may be received by the WTRU. Upon receiving the TPC commands, the WTRU may apply each of the TPC commands to the associated PUCCH. Alternatively, the WTRU may combine all the TPC commands into a single TPC command and apply the TPC command for all the PUCCHs on the UL CC. For example, the TPC commands may be treated as identical. Once the WTRU successfully decodes the TPC command in one of the corresponding PDCCHs in a subframe, it applies the TPC command for all the PUCCHs and may not decode the other TPC commands in the subframe.

If more than one channel is being transmitted simultaneously, the channels may use the same TPC commands. For example, the TPC commands for the PUSCH may be used by the WTRU for the PUCCH. In this case, the eNB will not send the TPC commands for PUCCH and the closed loop component for PUCCH, as shown above in Equation 1, but may rely on the TPC commands for PUSCH instead. The accumulate TPC commands for PUSCH may be used by the WTRU.

Alternatively, if more than one channel is simultaneously transmitted, the TPC commands may be combined by the WTRU. For example, the TPC commands for PUSCH and PUCCH, respectively, may be combined and the combined TPC command may be applied by the WTRU to both the PUSCH and the PUCCH. The accumulation TPC commands for PUSCH may be used.

The PUSCH and the PUCCH may be transmitted on a single UL CC. Furthermore, multiple PUCCHs, if necessary, may be simultaneously transmitted on a UL CC. Power control for the simultaneously transmitted PUCCH and PUSCH may be implemented per physical channel and/or per CC, using Equation 1 and Equation 5, respectively. If the sum of the required transmit power for the PUSCH and the PUCCH on UL CC(k) exceeds $P_{CMAX}$(k) where $P_{CMAX}$(k) is the CC-specific configured maximum WTRU transmit power for UL CC(k), the WTRU may need to back off the total transmit power to $P_{CMAX}$(k). The CC-specific maximum transmit power, $P_{CMAX}$(k), may be signaled by the eNB via higher layer signaling.

The power control scheme for multiple CCs may depend on the WTRU's radio frequency (RF)/transceiver architecture. In particular, the scheme may depend on the number of PAs in the WTRU. Contiguous CCs may use the same PA, while non-contiguous CCs may use separate PAs. If multiple UL CCs are transmitted, the sum of the powers on the individual UL CCs may not exceed a configured total maximum WTRU transmit power, $P_{CMAX}$, where $P_{CMAX}$ may depend on the WTRU power class, allowed tolerances and adjustments, and a maximum allowed transmit power signaled to the WTRU by the eNB. The value of $P_{CMAX}$ may be provided by the eNB via higher layers.

$P_{CMAX}$ may be less than or equal to the sum of the CC-specific maximum transmit powers, $P_{CMAX}$(k), on all the active UL CCs. When the WTRU is equipped with multiple PAs, for example, for multiple non-contiguous CCs in different frequency bands, Pcmax may be equally distributed among all the PAs such that $P_{CMAX\_PA\_i} = P_{CMAX} - 10 * \log 10(N)$ (dBm) where $P_{CMAX\_PA\_i}$ is the maximum transmit power supported by the individual PA and N is the number of PAs at the WTRU device. Alternatively, $P_{CMAX\_PA\_i}$ may be different for different PAs. If the total required WTRU transmit power exceeds $P_{CMAX}$, the WTRU may need to back off the transmit power to reduce it in order to not exceed $P_{CMAX}$. If the required power for a specific PA exceeds the PA maximum allowed power, $P_{CMAX\_PA\_i}$, the WTRU may need to reduce the transmit power in order to not exceed $P_{CMAX\_PA\_i}$.

In addition to UL carrier aggregation, for WTRUs supporting UL MIMO, each antenna may be connected to a PA and each PA may have a different maximum transmit power requirement. The WTRU transmit power for each physical channel may be distributed over the transmit antennas. When the total required transmit power on each antenna exceeds the maximum PA power, the WTRU may need to adjust the transmit power to avoid exceeding the limit.

A WTRU may be limited by multiple levels of maximum power transmission. The WTRU may have a total transmission power limitation. Each CC may have a power limit. Each PA may have a power limit. Each transmission channel may have a power limit. Therefore, a WTRU must contend with multiple limitations of the WTRU's transmit power.

The maximum transmit power of a WTRU may be limited by the WTRU's power class definition, a higher layer configuration or by the WTRU's PAs. The WTRU transmit (TX) power may be subject to maximum power limitations.

For example, the total WTRU power on a individual UL CC(k) may be subject to a CC-specific maximum TX power $P_{CMAX}$(k). The sum of the WTRU TX power on all active CCs may be subject to a total maximum TX power $P_{CMAX}$. The total TX power on each CC group(m) may be subject to a maximum CC group TX power, denoted by $P_{CMAX\_CC\_group}$(M), where the CC(m) consists of a subset of UL CCs and $$P_{CMAX\_CC\_group}(m) < \sum_{k \in CC\_group(m)} P_{CMAX}(k).$$

For example, a CC group may consist of contiguous UL CCs sharing the $i^{th}$ PA in the WTRU. In this case, $P_{CMAX\_CC\_group}$(M) may be equal to the maximum PA power, $P_{CMAX\_PA\_i}$. If any combination of the above maximum power limitations occurs in a subframe transmitted by the WTRU, the WTRU may need to reduce or scale the transmit power properly, in order to not violate the power limitations.

When a WTRU is transmitting using multiple CCs and simultaneous PUSCH and PUCCH transmission, the transmit power of the PUSCH and/or the PUCCH on each CC may be computed independently per physical channel per CC. The WTRU may use Equation 1 for PUSCH and Equation 5 for PUCCH. In a subframe, if the sum of all the power levels on all the CCs exceeds the total maximum WTRU power, $P_{CMAX}$, and/or the total transmit power on an UL CC(k) exceeds the CC-specific maximum power, $P_{CMAX}$(k), the WTRU may reduce or scale some or all of the transmit power levels properly. For example, if the total transmit power on UL CC(k) exceeds $P_{CMAX}$(k), then the WTRU initially may reduce the total power on that UL CC(k) to $P_{CMAX}$(k). If the sum of all the transmit power levels on all the UL CCs exceeds the total maximum WTRU power, $P_{CMAX}$, the WTRU may reduce the total power over all the CCs to $P_{CMAX}$.

Power reduction may be based on a priority of the CCs and the channels on each CC. The priority may be determined based on requirements for control and data transmission and/or quality of service (QoS) of data. In one example, the PUCCH may be prioritized over PUSCH, particularly when the PUSCH does not include UL control information (UCI). PUSCH with UCI may have priority over a PUSCH without UCI. Similarly, a UL CC carrying the PUCCH or PUSCH with UCI may have priority over other UL CC carrying a PUSCH without UCI. The WTRU may prioritize UL CCs and then prioritize channels on the prioritized individual UL CC. Some UL CCs or channels may be dropped and the transmit power of the channel scaled or set to zero, if necessary.

The channel priority and/or CC priority may be predefined and signaled to the WTRU through higher layers. Alternatively, the WTRU may autonomously determine the priority and the eNB may do blind detection on the transmitted physical channels with priority.

When an UL CC(k) includes a simultaneous PUSCH/PUCCH transmission and the sum of the powers of the PUSCH and all the PUCCHs exceeds $P_{CMAX}$(k), the WTRU may reduce the power of some of the channels based on channel priority. For example, the PUCCH may have priority over the PUSCH and the power of the PUSCH may be reduced without the PUCCH power being affected. The PUSCH may be dropped, if the reduced power of the PUSCH is less than a predefined threshold or a minimum transmit power. Furthermore, if there is a need to further reduce the power of other channels, such as other PUCCHs, the WTRU may reduce the power of some of PUCCHs with next lowest priority to remain within the maximum transmit power limitation ($P_{CMAX}(k)$).

Figure 8:
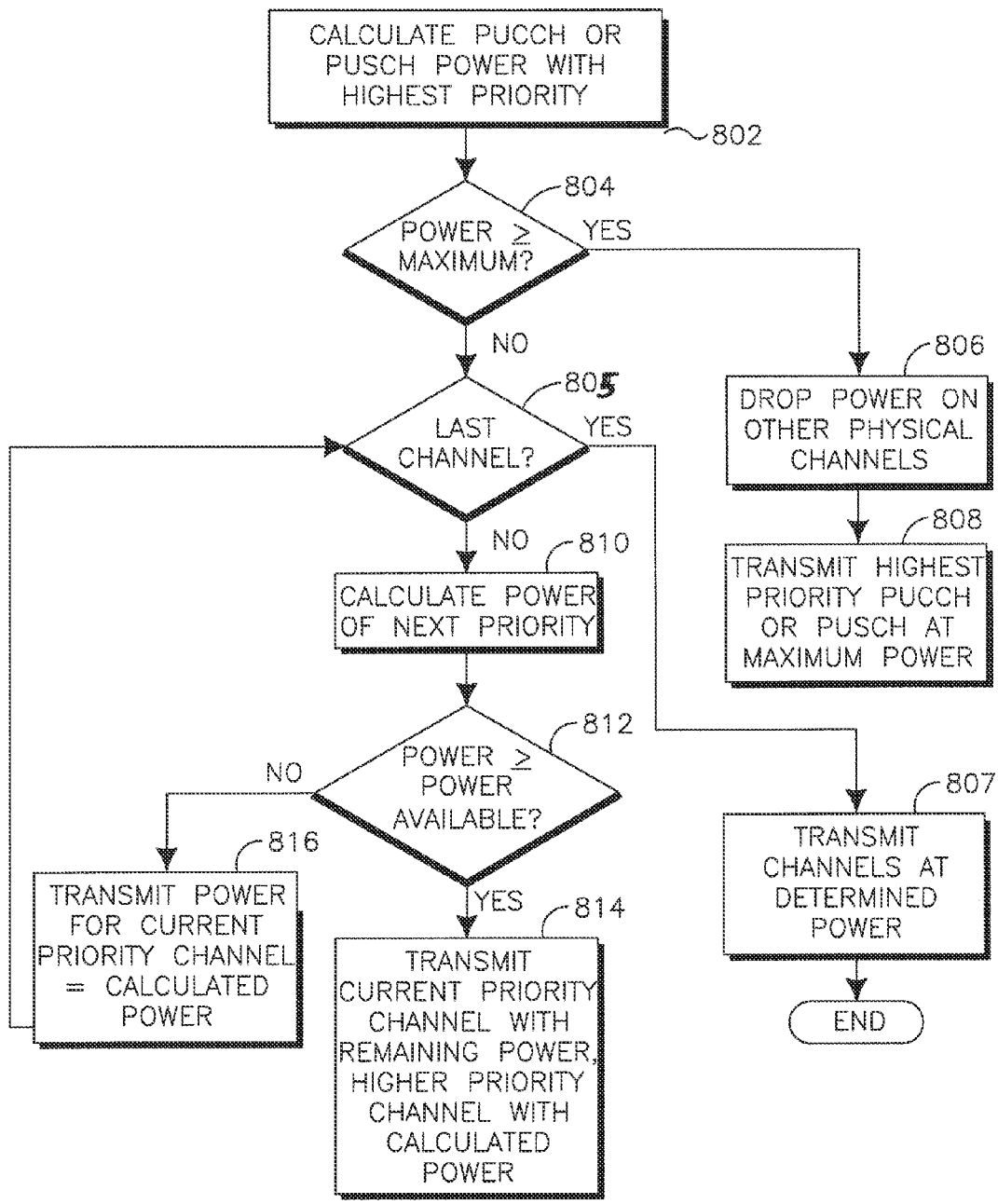
FIG. 8 is a flow chart showing a power control method in accordance with an alternative embodiment.

FIG. 8 is a flow chart showing a power control method 800 in accordance with an alternative embodiment. At 802, the WTRU may calculate the power of a PUCCH or PUSCH with a highest priority. At 804, the resulting power level, $P_{1st\_priority}$, may be compared to a maximum power level. If the $P_{1st\_priority}$ is equal to or greater than the maximum WTRU power, Pcmax, or maximum WTRU PA power, Pcmax_i, then, at 806, all other physical channels may be dropped. At 808, the PUCCH or PUSCH with highest priority may be transmitted at the maximum power. Otherwise, at 805, the WTRU determines if the channel currently being configured is the last channel. If not, at 810, the WTRU calculates the power of a PUCCH or PUSCH with next priority, using, for example, a CQI value. At 812, the calculated power level, $P_{2nd\_priority}$, is compared to the available WTRU power. If $P_{2nd\_priority}$ is equal to or greater than the available WTRU power (i.e., Pcmax-$P_{1st\_priority}$), then, at 814, the WTRU transmits only the first two priority physical channels where the first priority physical channel is transmitted at the calculated transmit power, $P_{1st\_priority}$, and the second priority physical channel is transmitted at the remaining WTRU power. Otherwise ($P_{2nd\_priority}$<Pcmax-$P_{1st\_priority}$), at 816, all of $P_{2nd\_priority}$ is used for the second priority channel. The procedure then returns to 805 and may be repeated with the remaining physical channels, if any, with priority, as long as the remaining WTRU transmit power is not less than or equal to zero or a minimum transmit power level.

If, however, at 805, the WTRU determines that it is configuring the last channel, the WTRU transmits all channels at their determined power levels and ends the procedure.

When one CC includes a simultaneous PUSCH/PUCCH transmission and the total power of the PUSCH in a subframe exceeds $P_{CMAX}$, the power per radio bearer (RB) may be reduced by the same amount such that the reduced total power is equal to $P_{CMAX}$. Alternatively, for a simultaneous PUSCH/PUCCH transmission, if the sum of the powers of PUSCH and PUCCH exceeds $P_{CMAX}$, a proper power adjustment method may be performed to maintain the maximum transmit power limitation. WTRU power may be allocated based on priority where the priority is determined by control information and data in the subframe.

Figure 9:
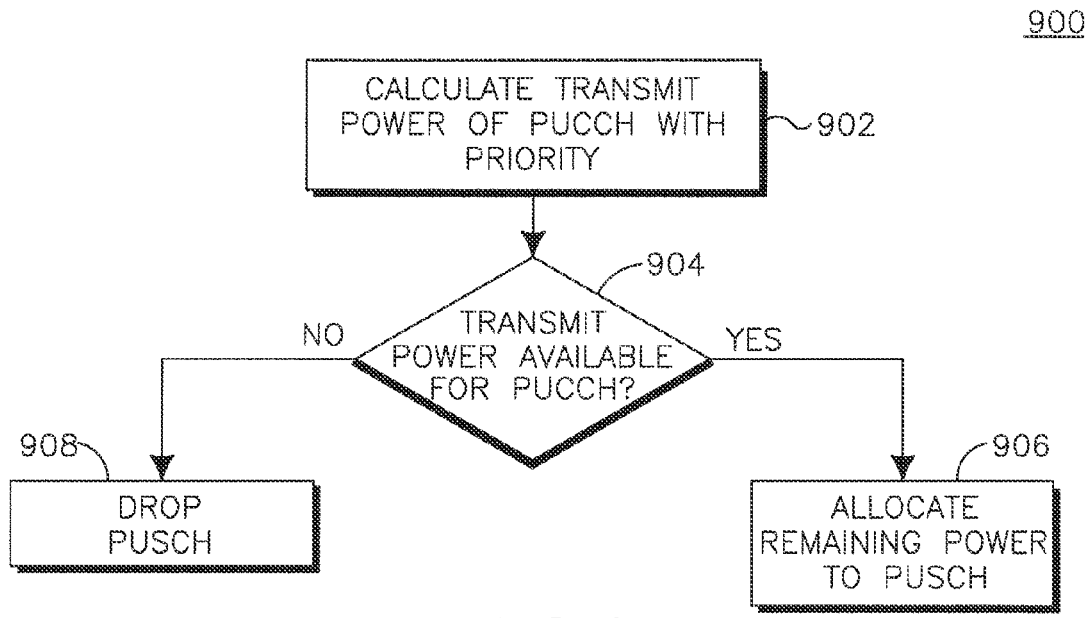
FIG. 9 is a flow diagram of a method of power control in accordance with another alternative embodiment.

FIG. 9 is a flow diagram of a method of power control 900 in accordance with another alternative embodiment. In another embodiment, at 902, the WTRU calculates the transmit power of the PUCCH. If multiple PUCCHs occurs in the subframe, calculate the transmit power of each PUCCH with priority. At 904, the WTRU determines if there is sufficient power available for the PUCCH transmission. If there is available power for PUCCH transmission, at 906 the remainder of any power is allocated to the PUSCH transmission. Otherwise, at 908, the WTRU drops the PUSCH transmission.

Figure 10:
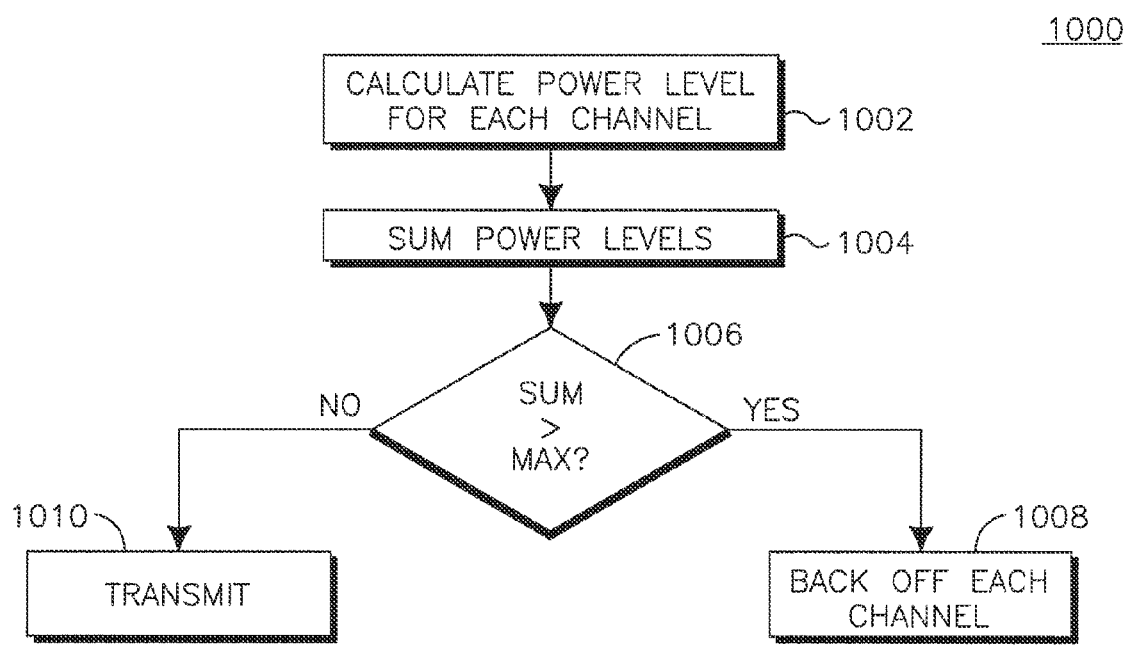
FIG. 10 is a flow diagram of a method of power control in accordance with yet another alternative embodiment.

FIG. 10 is a flow diagram of a method of power control 1000 in accordance with yet another alternative embodiment. At 1002, the WTRU calculates the transmit power levels of the individual physical channels. At 1004, the WTRU sums the power levels. At 1006, the WTRU compares the sum of all the power levels to the maximum allowable power. If the sum of all the power levels exceeds the maximum transmit power, at 1008 the power levels of each channel are backed off. Otherwise, at 1010, the channels are transmitted.

When the PUSCH and PUCCH are simultaneously transmitted on an UL CC and the sum of the power levels exceeds the maximum transmit power, the power density, that is, the power per subcarrier, may be reduced by the same amount such that the reduced total power is equal to the maximum power.

Alternatively, for a simultaneous PUSCH/PUCCH transmission, if the sum of the powers of the PUSCH and the PUCCH exceeds a maximum power, a proper power adjustment method may be performed to maintain the maximum transmit power limitation. WTRU transmit power may be allocated based on priority.

The sum of all the power levels on all the CCs may exceed a maximum WTRU allowed transmit power, such as the maximum WTRU transmit power, Pcmax, or a maximum transmit power allowed for the particular PA, $P_{CMAX\_PA\_i}$. In this case, the WTRU may reduce some or all of the transmit power levels across all or some of the UL CCs. For example, the WTRU may reduce the transmit power on at least some of the UL CCs by a relative amount. For example, the power reduction amount for a UL CC may be relative to the total transmit power on the CC, which is the sum of the transmit power levels of the PUSCH and/or the PUCCH on the CC. The transmit power of the PUSCH and/or the PUCCH may be determined independently per channel and per CC according to Equation 1 for PUSCH and Equation 5 for PUCCH.

After the power reduction operation, the sum of all the power levels across all the CCs may be at least close to, and may equal the maximum WTRU allowed transmit power. The sum of all the power levels across all CCs may not exceed the maximum WTRU allowed transmit power. Alternatively, the power reduction factors used by the WTRU on the UL CCs may be configured by the eNB.

When the WTRU uses multiple UL CCs, the power reduction may be based on a priority of the channels on an individual UL CC where the priority may be determined based on the type or requirements of each channel on each CC. For example, if a PUCCH is transmitted on a UL CC, then the UL CC may be scaled down last. The power of lower priority UL CCs is reduced before the power of the higher priority UL CCs. The WTRU may choose a subset of the UL CC's for UL transmission based on priority of the CCs, for example, choosing UL CCs with the highest priority. Some of lower priority UL CCs may be dropped first.

When using a subset of CCs, and PUSCH and PUCCH are simultaneously transmitted, a PUCCH transmission, particularly if it includes critical feedback information, such as an ACK/NACK in PDCCH or UCI on PUSCH, may have priority over a PUSCH transmission without UCI. The WTRU may choose a CC for power allocation based on which CC has an UL grant, requires the least required transmit power, the CC with the least pathloss or the CC that has a retransmitted data packet. Alternatively, the eNB may choose the subset.

Once a subset of the CC's is selected, the WTRU may recalculate the power levels for the physical channels on the CCs in the selected subset. If, after the UL CCs are selected, the WTRU power level is at or above the maximum power limitation, then the WTRU may reduce the power of at least some of the chosen CCs according to an appropriate and relevant power reduction method. The physical channels on CCs that are not selected may not be transmitted in the subframe. That is, the physical channels on the non-selected CCs may be dropped.

If there are multiple CCs using separate PAs, there may be an association between the CCs and the PAs. For example, a set or subset of contiguous CCs may share a PA. The transmit power of the PUSCH and/or the PUCCH on each CC may be computed independently per physical channel per CC according to Equation 1 for PUSCH and Equation 5 for PUCCH. The WTRU may need to check whether there is any maximum power limitation, for example, CC-specific maximum power limitation, PA-specific, CC group specific maximum power limitation, and/or total maximum power limitation. The WTRU's top priority may be to comply with the CC-specific maximum power limitation ($P_{CMAX}(k)$) during the WTRU's determination of the transmission power for the PUSCH and/or the PUCCH. Furthermore, when there is a simultaneous PUSCH and PUCCH transmission on a CC, the CC-specific maximum power limitation is complied with using any of the relevant CC-specific power reduction techniques described herein.

After implementing the CC-specific maximum power limitation procedure, the WTRU may check to determine if the maximum power limitation of each PA is violated such that the sum of the powers on all the individual CCs sharing the PA exceeds the maximum PA allowed power. For example, for PA(i), $$P_{CMAX\_PA\_i} < \sum_{k \in CC\_PA\_i} (P_{PUSCH}(k) + P_{PUCCH}(k)).$$

If there is a violation of the maximum PA power limitation for a PA, the WTRU may comply with the limitation by applying a proper power reduction technique as described herein.

The WTRU may check whether the WTRU total maximum allowed transmit power across all the UL CCs, for example, $P_{CMAX}$, is reached. If the maximum allowed transmit power across all the UL CCs is reached, the WTRU may reduce some or all of the transmit power levels across some or all of the UL CCs according to a proper power reduction technique as described herein, such that that the WTRU total maximum allowed transmit power is not exceeded.

Since the PUSCH and the PUCCH can be transmitted at the same time, as well as on non-contiguous RBs even on a single UL CC, the total transmitted signal waveform does not have the same properties as of a single carrier frequency domain multiplex access (SC-FDMA) signal. This may result in an increase in the cubic metric (CM), or peak-to-average power ratio (PAPR), of the transmitted signal. The increased CM of the two simultaneous transmissions for the WTRU may need to meet linearity requirements, such as error vector magnitude (EVM) and adjacent power leakage power ratio (ACLR) requirements, for example. As the WTRU transmit power for the PUSCH and PUCCH are controlled by an eNB, the WTRU may control the pathloss measurement and the WTRU may determine when not to exceed a maximum transmit power such as Pcmax, even in case of using a single UL CC. Therefore, a back-off mechanism may be available to the WTRU to reduce the maximum transmit power based on the WTRU capabilities and/or as directed by the eNB.

The WTRU may determine power back-off as a function of the CM of the PUCCH/PUSCH signals. The eNB may adjust the maximum power based on the known behavior of a specific WTRU or a generic WTRU. CM may be affected primarily by factors such as a number of non-contiguous radio bearers (RBs), modulation order, such as QPSK, 16 QAM, 64 QAM, and power ratios, for example, between PUSCH and PUCCH. As the power settings for PUSCH and PUCCH respectively are independent and dynamic, the ratio of $P_{PUSCH}(i)$ and $P_{PUCCH}(i)$ varies in time, implying variable CM. CM may vary in time.

When the WTRU uses a single UL CC, and PUSCH and PUCCH are simultaneously transmitted, the transmit power of PUSCH and/or PUCCH on each CC is computed independently per physical channel according to Equation 1 for PUSCH and Equation 5 for PUCCH. When the WTRU is transmitting on a single UL CC, $P_{CMAX}(k)$ in both Equation 1 and 5 may be equivalent to $P_{CMAX}$. After computing the power levels of PUSCH and PUCCH, respectively, denoted by $P_{PUSCH}(i)$ for PUSCH transmission and $P_{PUCCH}(i)$ for PUCCH transmission in subframe i, if the sum of the power levels is greater than a maximum WTRU allowed power such as $P_{CMAX}$ ($P_{PUSCH}(i)+P_{PUCCH}(i)>P_{CMAX}$), the WTRU may reduce the power of the channels based on channel priority first. Channel priority may be predefined. For example, if PUCCH is given greater priority that the PUSCH, pursuant to a predefined rule, the power of the PUSCH may be reduced before the power of the PUCCH. The PUSCH may be dropped completely if the reduced power of the PUSCH is less than a predefined threshold or a minimum transmit power. Furthermore, if there is a need to further reduce the power of the PUCCH, then the WTRU may reduce the power to comply with the maximum transmit power limitation (i.e., $P_{CMAX}$).

If $P_{PUSCH}(i)+P_{PUCCH}(i)>P_{CMAX}$, then the transmit power for PUCCH may be determined by Equation 5, set forth above. The transmit power for PUSCH is determined from the remaining available power, for example, $P_{CMAX}-P_{PUCCH}(i)$ (subtract in linear)), as in the equation:

$$P_{PUSCH}(i)=\min\{(P_{CMAX}-P_{PUCCH}(i),10\log_{10}(M_{PUSCH}(i))+P_{O\_PUSCH}(j)+\alpha(j)\cdot PL+\Delta_{TF}(i)+f(i)\} \quad \text{(Equation 15)}.$$

If $P_{PUSCH}(i)$ is less than a predefined value, for example, a minimum power, then the PUSCH is dropped.

Alternatively, for a maximum power limitation, the respective transmit power may be reduced equally as follows:

$$\tilde{P}_{PUSCH}(i)=P_{PUSCH}(i)-(i)(dBm) \quad \text{(Equation 16)},$$

$$\tilde{P}_{PUCCH}(i)=P_{PUCCH}(i)-(i)(dBm) \quad \text{(Equation 17)},$$

where $\Delta(i)$ is the power adjustment factor (in dB) in subframe i. The WTRU may determine the power adjustment according to the equation:

$$\Delta(i) = 10*\log 10 \left(10^{\frac{P_{PUSCH}(i)}{10}} + 10^{\frac{P_{PUCCH}(i)}{10}} - 10^{\frac{P_{CMAX}}{10}}\right)(dB). \quad \text{(Equation 18)}$$

Alternatively, $\Delta(i)$ may be provided by higher layers, such as using a look up table or via semi static signaling. $P_{PUSCH}(i)$ and $P_{PUCCH}(i)$ represent the required transmit powers of PUSCH and PUCCH in subframe i, respectively.

In yet another alternative, $\Delta_{PUSCH}(i)$ and $\Delta_{PUCCH}(i)$ may be proportional to $P_{PUSCH}(i)$ and $P_{PUCCH}(i)$, respectively.

For example, $$\Delta_{PUSCH}(i) \approx \left(\frac{a * P_{PUSCH}(i)}{P_{PUSCH}(i) + P_{PCSCH}(i)}\right) \cdot \Delta(i), \quad \text{(Equation 19)}$$

$$\Delta_{PUSCH}(i) \approx \left(\frac{b * P_{PUCCH}(i)}{P_{PUSCH}(i) + P_{PCSCH}(i)}\right) \cdot \Delta(i), \quad \text{(Equation 20)}$$

where a and b are additional scaling factors and both a and b are greater than or equal to zero (0). The terms a and b may be chosen so that one channel is less than another channel. The terms may be adjusted so that one channel is given higher priority, or favored. The terms a and b may be calculated by the WTRU or be configured by the eNB and signaled to the WTRU by higher layers. Alternatively, $\Delta_{PUSCH}(i)$ and $\Delta_{PUCCH}(i)$ may be provided by higher layers.

If either PUSCH or PUCCH alone exceeds $P_{CMAX}$, the channel that exceeds the maximum should be disproportionately reduced (or scaled down). For example, let $P_{PUSCH}(i)=10$ and $P_{PUCCH}(i)=2$. Using a reduction rule to reduce both by same relative amount results in, if $P_{CMAX}=10$, then $P_{PUSCH}(i)=(10/12)*P_{PUSCH}(i)$ and $P_{PUCCH}(i)=(10/12)*P_{PUCCH}(i)$. Since $P_{PUSCH}(i)+P_{PUCCH}(i)=Pmax=10$, both may be reduced by ⅙-th power. However, if $P_{CMAX}=8$, then $P_{PUSCH}(i)=(8/10)*(P_{PUSCH}(i)-2)$ and $P_{PUCCH}(i)=(8/10)*P_{PUCCH}(i)$. As $P_{PUSCH}(i)+P_{PUCCH}(i)=P_{CMAX}=8$, the PUSCH transmit power is reduced by a larger percentage than the PUCCH.

There may be different reduction rules based on the type of control information on PUCCH. For example, reduction may be shared equally between PUSCH and PUCCH, if PUCCH is carrying CQI, but if it is carrying ACK/NACK, the PUSCH may incur more power reduction than the PUCCH. For example, if $P_{PUSCH}(i)+P_{PUCCH}(i)>P_{CMAX}$, then:

$$\tilde{P}_{PUSCH}(i)=P_{PUSCH}(i)-\Delta_{PUSCH}(i)(dBm);$$

and $$\tilde{P}_{PUCCH,CQI}(i)=P_{PUCCH}(i)-\Delta_{PUSCH}(i)(dBm);$$

or $$\tilde{P}_{PUCCH,CQI}(i)=P_{PUCCH}(i)-\Delta_{PUSCH,CQI}(i)(dBm);$$

and $$\tilde{P}_{PUCCH,ACK}(i)=P_{PUCCH}(i)-\Delta_{PUSCH,ACK}(i)(dBm),$$

where $\Delta_{PUSCH}(i)$, $\Delta_{PUCCH,CQ}(i)$, and $\Delta_{PUCCH,ACK}(i)$ are the power adjustment factors for the PUSCH, CQI on PUCCH, and ACK/NACK on PUCCH, respectively, in subframe i where $\Delta_{PUSCH}(i) \geq \Delta_{PUCCH,CQ}(i) \geq \Delta_{PUCCH,ACK}(i)$.

Reduction rules may depend on multiple input/multiple output (MIMO) mode or hybrid automated retransmission request (HARQ) retransmission number, for example. For a HARQ retransmission, then the PUSCH may perform less power reduction as the number of retransmissions increases.

Maximum transmit power limit, for example, $P_{CMAX}$ may be backed-off by the WTRU based on a preconfigured rule. The WTRU may adjust $P_{CMAX}$ as a function of increased cubic metric (CM) of the simultaneous PUCCH/PUSCH waveform, or any method that estimates the maximum power and meets ACLR/EVM requirements. The increased CM, (delta_CM), is the required power back-off, or allowed maximum power back-off, as a function of the number of non-contiguous clusters, PSUCH modulation type, and the power ratio between PUSCH and PUCCH. Each WTRU may determine the increased CM of each UL transmission, which is based on a given UL grant, and then back-off $P_{CMAX}$ by subtracting delta_CM from $P_{CMAX}$ or maximum WTRU power for the WTRU power class, denoted by $P_{UMAX}$, as required. The WTRU may calculate the delta_CM of UL signals and may change $P_{CMAX}$ or $P_{UMAX}$ dynamically, perhaps as fast as every subframe.

Alternatively, a parameter look-up table showing delta_CM may be signaled to the WTRU from an eNB. The table may use an index that corresponds to a number of discontinuities in RB allocation, a number of discontinuities for a given PA, PSUCH modulation type, the power ratio between PUSCH and PUCCH, the precoding used, and other relevant parameters. Table 2 is an example of a delta_CM look-up table.

TABLE 2 delta_cm

| Index, k | delta_cm | number of discontinuities in RB allocation | number of discontinuities for a given PA | modulation type for PUSCH | power ratio between PUSCH and PUCCH |
|---|---|---|---|---|---|
| 1 | $X_1$ dB | 2 | 1 | QPSK | 1 |
| 2 | $X_2$ dB | 3 | 1 | QPSK | 1 |
| 3 | $X_3$ dB | 4 | 1 | QPSK | 2 |
| 4 | $X_4$ dB | 5 | 1 | QPSK | 2 |
| 5 | $X_5$ dB | 3 | 2 | QPSK | 3 |
| 6 | $X_6$ dB | 4 | 3 | QPSK | 4 |
| 7 | $X_7$ dB | 5 | 3 | QPSK | 6 |
| 8 | $X_8$ dB | 2 | 1 | 16QAM | 1 |
| 9 | $X_9$ dB | 3 | 1 | 16QAM | 1 |
| 10 | $X_{10}$ dB | 4 | 1 | 16QAM | 2 |
| 11 | $X_{11}$ dB | 3 | 2 | 16QAM | 4 |
| 12 | $X_{12}$ dB | 4 | 2 | 16QAM | 5 |
| 13 | $X_{13}$ dB | 2 | 1 | 64QAM | 1 |
| 14 | $X_{14}$ dB | 3 | 1 | 64QAM | 1 |
| 15 | $X_{15}$ dB | 3 | 2 | 64QAM | 2 |
| 16 | $X_{16}$ dB | 3 | 3 | 64QAM | 4 |

DL signaling may be designed to support relevant parameters, such as a delta_CM table and a delta_CM index, for maximum WTRU power settings. DL signaling may also be designed to support a lookup table for PH reporting. The WTRU may check ACLR/EVM/CM requirements and maximum power, and perform additional back-off, if required, after performing power control using the delta_CM parameter. The eNB includes the details of the allocation for both PUSCH and PUCCH. Rather than use a look-up table for back-off, the eNB may estimate the CM. Accordingly, $P_{CMAX}$ can be lowered when an eNB makes an UL grant to a WTRU for simultaneous PUCCH and PUSCH transmission. The eNB can manage the power ratio of PUCCH and PUSCH as well. As a rule, the PUCCH power level may not be reduced, or scaled down. The PUSCH power may be backed-off, as required, to maintain linearity, especially in case of maximum power limitation Alternatively, PUSCH power may be not reduced or scaled down.

A maximum power value, for example, $P_{CMAX}$ may accommodate a worst case condition, even though many transmission cases would have more favorable power requirements and limitation. Maximum power in a particular power class, with simultaneous PUSCH and PUCCH transmission may be defined by a look up table. Table 3 is an example of a look-up table for maximum power.

TABLE 3

Power Rating

| Index | Ratio (dB) PUSCH/PUCCH | $P_{CMAX}$ (dB) where Pcmax = 23 |
|---|---|---|
| 1 | Ratio >10 | Pcmax − 1 |
| 2 | 10 > ratio > 5 | Pcmax − 2 |
| 3 | 5 > ratio > −5 | Pcmax − 3 |
| 4 | −5 > ratio > −10 | Pcmax − 4 |
| 5 | −10> ratio | Pcmax − 5 |

$P_{CMAX}$ may also be a function of other variables, including separation in frequency and/or number of discontinuities in resource allocation.

TPC commands may be accumulated. However, if a WTRU reaches $P_{CMAX}$ after summing up the powers of PUSCH and PUCCH, respectively, positive TPC commands for PUSCH and PUCCH may not be accumulated. Similarly, if the calculated transmit power of PUSCH exceeds $P_{CMAX}$, positive TPC commands for PUSCH may not be accumulated. However, if the calculated transmit power of PUCCH exceeds $P_{CMAX}$, positive TPC commands for PUCCH may be accumulated.

TPC commands may have a unique interpretation when they correspond to simultaneous PUCCH and PUSCH transmission, both with and without SRS and non-contiguous PUSCH. TPC commands may have a large enough magnitude so that the eNB may reduce power by a larger step for UL transmission with larger CM. Table 4 is an example of a TPC command table.

TABLE 4

TPC Commands

| TPC Command Field in DCI format 0/3 | Accumulated $\delta_{PUSCH}$ [dB] | Absolute $\delta_{PUSCH}$ [dB] only DCI format 0 | Accumulated $\delta_{pucch + pusch}$ [dB] | Absolute $\delta_{pucch - pusch}$ [dB] only DCI format 0 |
|---|---|---|---|---|
| 0 | −1 | −4 | −2 | −5 |
| 1 | 0 | −1 | −1 | −2 |
| 2 | 1 | 1 | 0 | 0 |
| 3 | 3 | 4 | 2 | 3 |

If a WTRU has reached the configured maximum WTRU transmitted power, $P_{CMAX}$, positive accumulation TPC commands may not be accumulated. However, if $P_{UMAX}$ is reached for a particular subframe where $P_{UMAX}$ is the maximum WTRU power for the WTRU power class but $P_{CMAX}$ has not been reached, TPC commands may be accumulated. If $P_{CMAX}$ is reached for a particular subframe, but $P_{UMAX}$ has not, then TPC commands may not be accumulated. If $P_{CMAX}$ is reached for a particular subframe, but the corresponding allocation is non-contiguous, TPC commands may be accumulated. If $P_{UMAX}$ is reached for a particular subframe, but the corresponding allocation is non-contiguous, then TPC commands may be accumulated. If $P_{CMAX}$ is reached for a particular subframe, but the corresponding allocation is simultaneous with PUCCH, then TPC commands may be accumulated. If accumulation TPC commands for PUCCH are included in PDCCH, then positive TPC commands for PUCCH may not be accumulated.

If $P_{UMAX}$ or $P_{CMAX}$ is reached for a particular subframe, but the corresponding allocation is simultaneous with PUSCH, then TPC commands may be accumulated. In addition, if the WTRU has reached minimum power for PUSCH or PUCCH, negative TPC commands for the corresponding channels may not be accumulated.

If the WTRU has reached the configured WTRU transmitted power and if accumulation TPC commands for PUSCH are included in PDCCH, positive TPC commands for PUSCH may not be accumulated. If accumulation TPC commands for PUSCH are included in the PDCCH, PUSCH may not be accumulated.

When the sum of the ideally computed powers exceeds $P_{CMAX}$, the individual power levels may be reduced by separate offsets, $\Delta_{PUSCH}(i)$ and $\Delta_{PUCCH}(i)$. Each offset may be calculated in each UL subframe by the WTRU or provided by higher layers, according to its own requirement, but satisfying the equation $\tilde{P}_{PUSCH}(i)\tilde{P}_{PUCCH}(i)=P_{c\ max}$.

The reliability requirements for PUCCH and PUSCH are typically different. Therefore, careful setting of the power levels is desirable, particularly if the sum of the ideally computed powers exceeds $P_{CMAX}$.

Under certain conditions, such as maximum power limitation, for example, the WTRU may be configured to have concurrent PUSCH/PUCCH transmission or to include uplink control information (UCI) in PUSCH. If $P_{PUSCH}(i)+P_{PUCCH}(i)>P_{CMAX}$, then the WTRU may carry UCI over the PUSCH. The eNB may configure the WTRU through, for example, higher layer signaling or L1/L2 signaling, whether to carry UCI over PUSCH. A toggling bit may be used in the PDCCH that indicates a particular DCI format. The eNB may determine the configuration based on, for example, power headroom (PH) reporting from the WTRU.

For example, a WTRU may be configured to carry UCI on the PUSCH. If PH>γ, where γ represents a predefined threshold for the configuration, the eNB may reconfigure the WTRU through higher layer signaling, L1/L2 signaling or toggling a bit, to go back to concurrent PUCCH and PUSCH transmission.

Alternatively, the WTRU may autonomously determine which control signaling scheme may be used in a subframe. For instance, if $P_{PUSCH}(i)+P_{PUCCH}(i)<P_{CMAX}-\gamma$, concurrent PUSCH/PUCCH transmissions may be used. The WTRU's determination may be based on the transmit power available for PUCCH. For example, if $\tilde{P}_{PUCCH}(i)-P_{PUCCH}(i)>\eta$ where η represents the threshold for a maximum PUCCH power reduction factor, concurrent PUSCH/PUCCH transmission may be used. The term $\tilde{P}_{PUCCH}(i)$ is the transmit power of PUCCH after power reduction, if any, where $\tilde{P}_{PUCCH}(i)$ can be calculated by a transmit power reduction method.

An eNB may perform blind detecting and/or decoding for extracting UCI. If the sum of the PUSCH and PUCCH transmission power reaches a maximum allowed power by a threshold $\beta_1$, the WTRU may switch to a non-simultaneous PUSCH/PUCCH transmission mode if the sum of the PUSCH and PUCCH transmission power reaches the maximum allowed power by a threshold $\beta_2$.

If UL L1/2 control signaling, such as UCI, is time multiplexed with data on the PUSCH, such as UCI transmission, the transmit power may be kept constant over the subframe. $P_{PUSCH}(i)$ may be determined using a power offset as:

$$\tilde{P}_{PUSCH}(i) = P_{PUSCH}(i) + \epsilon \quad \text{(Equation 21)},$$

where $\epsilon$ is the power offset which can be configured via higher layer signaling. $\epsilon$ may be function of the offset between the code rate for the control part and the modulation and code rate used for the data part.

Alternatively, in order to increase coding gains for either the control part or the data part, when there is SRS configured to be transmitted in the same subframe, the WTRU may use the discreet Fourier transform-orthogonal frequency domain multiplex (DFT-OFDM) symbol, for example, the last symbol in the subframe, for either the control part or the data part rather than the SRS. Alternatively, either the control part or the data part is punctured into a frequency part of the SRS region where the frequency part corresponds to that used for PUSCH in the other DFT-OFDM symbols.

Depending on the power headroom, CM increment, reliability requirements and priority for control information, such as ACK/NACK, CQI and SR, for example, and data, respectively, the WTRU may autonomously determine a combination of control and/or data channel types to be transmitted in a subframe. For example, if $PH < -\mu_1$ (dB), the WTRU may drop either PUSCH or PUCCH and give the full power to the other channel. Otherwise, if $PH < -\mu_2$ (dB), the WTRU may drop CQI and/or SR and split the maximum power into PUCCH and PUSCH where PUCCH carries ACK/NACK, for example, and perhaps other feedback signals.

If $PH < -\mu_3$ (dB), the WTRU may not drop any channels and may transmit both PUCCH and PUSCH using one of the power reduction methods disclosed herein. The terms $\mu_1$, $\mu_2$, $\mu_3$ are cell and/or WTRU specific parameters where $\mu_1 > \mu_2 > \mu_3 > 0$.

The eNB may require information about the channel combination in a given subframe. The WTRU may explicitly inform the eNB of the combination information used in the subframe via, for example, L1/2 signaling with 1 or 2 bits on an UL channel such as the PUCCH, for example. Alternatively, separate control signaling may be used in the UL. By way of another alternative, the eNB may determine the channel combination in use in the given subframe by, for example, performing blind detection and/or decoding to extract and/or decode the control information.

The eNB may determine the combination of channel types to be transmitted in a subframe. This may be based on power headroom. The eNB may signal the resulting combination to the WTRU via higher layers or on the PDCCH with a particular DCI format, for example. The transmit power setting for PUSCH and PUCCH, respectively, may be written as:

$$P_{PUSCH}(i) \min \{ P_{CMAX,PUSCH}, 10 \log_{10}(M_{PUSCH}(i)) + P_{O\_PUSCH}(j) + \alpha(j) \cdot PL + \Delta_{TF}(i) + f(i) \} \quad \text{(Equation 22)},$$

and $$P_{PUCCH}(i) = \min \{ P_{CMAX,PUCCH}, P_{O\_PUCCH} + PL + h(n_{CQI}, n_{HARQ}) + \Delta_{F\_PUCCH}(F) + g(i) \} \quad \text{(Equation 23)}.$$

The transmit power of one of the PUSCH or the PUCCH may be below maximum power, while the transmit power of the other may be above its maximum. The extra power in the one channel may be added to the other. Alternatively, the power settings for PUSCH and PUCCH may be set jointly.

The WTRU may calculate the transmit power for PUSCH. The transmit power for PUCCH may then be offset to the resulting PUSCH transmit power by an offset factor, $\phi_{PUCCH}$, as in the equation $P_{PUCCH}(i) = P_{PUSCH}(i) + \phi_{PUCCH}$, where $\phi_{PUCCH}$ may be configured by higher layers and depend on the modulation type and coding rate used for the UL subframe.

If the PUSCH also includes an SRS, and the PSUCH is simultaneously transmitted with the PUCCH, SRS may be time multiplexed with PUSCH, but frequency multiplexed with PUCCH in last symbol. The SRS may otherwise be punctured by the PUSCH. In either case, the WTRU may apply two separated back-off procedures.

Power headroom (PH) may be defined per UL CC as:

$$PH(i,k) = P_{CMAX} - \{ 10 \log_{10}(M_{PUSCH}(i,k)) + P_{O\_PUSCH}(j,k) + \alpha(j,k) \cdot PL(k) + \Delta TF(i,k) + f(i,k) \} \quad \text{(Equation 24)},$$

where $PH(i,k)$ is the WTRU PH valid for subframe i on UL CC(k). Alternatively, PH may be defined per UL CC as:

$$PH(i,k) = P_{CMAX}(k) - \{ 10 \log_{10}(M_{PUSCH}(i,k)) + P_{O\_PUSCH}(j,k) + \alpha(j,k) \cdot PL(k) + \Delta TF(i,k) + f(i,k) \} \quad \text{(Equation 25)}.$$

PH reporting may be configurable. The WTRU transmit power on a certain CC may be different from that on other CCs due to different pathlosses and channel configurations. The WTRU may transmit to the eNB a PH report per CC. In certain cases, for example, when the aggregated carriers are contiguous, a wideband PH report may be transmitted. The eNB could configure the WTRU to report the PH.

The WTRU may report a CC specific PH. The CC specific PH may be rounded to the closest value in the range in dB, with steps of 1 dB, for example, and delivered by the physical layer to higher layers.

The WTU may alternatively report a CC group specific PH report. The WTRU may configure the groups of CCs in accordance with instructions from the eNB and compute the PH for a group of CCs as follows:

$$PH(i, k_G) = P_{CMAX} - 10\log_{10}\left\{ \sum_{k \in k_G} 10^{\frac{10\log_{10}(M_{PUSCH}(i,k)) + P_{O\_PUSCH}(j,k) + \alpha(j,k) \cdot PL(k) + \Delta_{TF}(i,k) + f(i,k)}{10}} \right\}, \quad \text{(Equation 26)}$$

where $k_G$ represents the $k^{th}$ CC group. $P_{CMAX}$ may be replaced with a value for maximum transmit power allowable for each CC group, which may be signaled from the eNB. Alternatively, the WTRU may determine a maximum transmit power for each CC group, according to how UL CCs in a CC group are associated with the WTRU RF chain, including the PA. For example, when UL CCs in a CC group share a PA in the WTRU, then the maximum power for the CC group may be the maximum allowed power for the PA.

The WTRU may alternatively report a wideband PH. The calculated PUSCH transmit power levels on all the CCs are accounted for the PH reporting as:

$$PH_{WB}(i) = P_{CMAX} - 10\log_{10}\left\{ \sum_{k=1}^{K} 10^{\frac{10\log_{10}(M_{PUSCH}(i,k)) + P_{O\_PUSCH}(j,k) + \alpha(j,k) \cdot PL(k) + \Delta_{TF}(i,k) + f(i,k)}{10}} \right\} (\text{dB}), \quad \text{(Equation 27)}$$

where $PH_{WB}(i)$ is the wideband WTRU PH valid for subframe i. The range of $PH_{WB}(i)$ may be different than that for the CC specific or CC group specific PH reporting.

The eNB may send configuration information to the WTRU as to which PH reporting format the WTRU may use. Alternatively, the WTRU may autonomously determine the UL CCs on which it will send a PH report. When the WTRU reports the PH, an associated CC indictor may be sent together with the PH report. For example, the WTRU may be configured to send a wideband PH report, but the WTRU may detect that the calculated transmit power on a CCs exceeds or is below a predefined threshold In addition to the wideband PH reporting, the WTRU may send a PH report on the detected CCs along with an associated CC indicator.

The WTRU PH reporting may be based on a triggering mechanism. For example, when a CC specific PH value is less than a threshold, the WTRU may report the corresponding PH value to the eNB. In either CC specific PH or CC group specific PH reporting, whether the PH report corresponds to a CC or CC group may be indicated by a CC group indicator. The indicator is sent to the eNB along with the corresponding PH values.

An eNB may configure a WTRU to send a PH report based on a PUCCH even though there is no PUSCH transmission in a particular subframe on a CC. The WTRU may send a PH report based on PUSCH transmission only, when there is no simultaneous PUSCH/PUCCH transmission or no PUCCH transmission on an UL CC.

The WTRU may send a PH report based on PUCCH transmission only. This may be used for simultaneous PUSCH/PUCCH transmission on a UL CC. The WTRU may send a PH report based on both PUSCH and PUCCH transmissions. This mode may be used in the event of simultaneous PUSCH/PUCCH transmission on a UL CC.

When simultaneous PUSCH and PUCCH transmission occurs in a subframe i on UL CC(k), the CC specific WTRU PH for the subframe on the CC(k), for combined PUSCH and PUSCH power headroom reporting (PHR), the reported PH may be given by the equation:

$$PH(i,k) = P_{CMAX} - 10\log_{10}\left(10^{\frac{\{10\log_{10}(M_{PUSCH}(i,k)) + P_{O\_PUSCH}(j,k) + \alpha(j,k)\cdot PL(k) + \Delta_{TF}(i,k) + f(i,k)\}}{10}} + 10^{\frac{\{P_{O\_PUCCH}(k) + PL(k) + h(n_{CQI}, n_{HARQ}, k) - \Delta_{F\_PUCCH}(F) + g(i,k)\}}{10}}\right).$$ (Equation 28)

Alternatively, the reported PH may be expressed as:

$$PH(i,k) = P_{CMAX}(k) - 10\log_{10}\left(10^{\frac{\{10\log_{10}(M_{PUSCH}(i,k)) + P_{O\_PUSCH}(j,k) + \alpha(j,k)\cdot PL(k) - \Delta_{TF}(i,k) + f(i,k)\}}{10}} + 10^{\frac{\{P_{O\_PUCCH}(k) + PL(k) + h(n_{CQI}, n_{HARQ}, k) + \Delta_{F\_PUCCH}(F) + g(i,k)\}}{10}}\right).$$ (Equation 29)

Alternatively, the PH may be computed and reported individually for PUSCH and PUCCH and may be equal to $P_{CMAX}$ (or $P_{CMAX}(k)$) reduced, or subtracted by calculated transmit powers of the PUSCH and PUCCH, respectively, as indicated in the equations:

$$PH_{PUSCH}(i,k) = P_{CMAX}(k) - (10\log_{10}(M_{PUSCH}(i,k)) + P_{O\_PUSCH}(j,k) + \alpha(j,k)\cdot PL(k) + \Delta_{TF}(i,k) + f(i,k))$$ (Equation 30), and $$PH_{PUCCH}(i,k) = P_{CMAX}(k) - (P_{O\_PUCCH}(k) + PL(k) + h(n_{CQI}, n_{HARQ}, k) + \Delta_{F\_PUCCH}(F) + g(i,k))$$ (Equation 31), where $PH_{PUSCH}(i,k)$ and $PH_{PUCCH}(i,k)$ represent the PH reports for PUSCH and PUCCH, respectively. In Equation 30 and Equation 31, respectively, $P_{CMAX}(k)$ may be replaced with $P_{CMAX}$.

In yet another alternative, the calculated WTRU transmit power for PUSCH in subframe i on UL CC(k) in linear scale may be represented by the equation:

$$P_{calc\_PUSCH}(i,k) = 10((10\log_{10}(M_{PUSCH}(i,k) + P_{O\_PUSCH}(j,k) + \alpha(j,k)\cdot PL(k) + \Delta_{TF}(i,k) + f(i,k))/10)$$ (Equation 32)

Similarly the calculated WTRU transmit power for PUCCH in subframe i on UL CC(k) in linear scale may be represented by the equation:

$$P_{calc\_PUCCH}(i,k) = 10((P_{O\_PUSCH}(k) + PL(k) + (n_{CQI}, n_{HARQ}, k) + \Delta_{F\_PUCCH}(F) + g(i,k))/10)$$ (Equation 33).

In order to report PH for PUSCH alone, PH for PUCCH alone, or PH for PUSCH and PUCCH combined, PH for subframe i and CC(k) may be expressed as:

$PH(i,k) = 10 \log(Pcmax/Pcalc\_pusch)[dB]$;

$PH(i,k) = 10 \log(\min(Pcmax, Pcm)/Pcalc\_pusch)[dB]$;

$PH(i,k) = 10 \log(Pcmax/Pcalc\_pucch)[dB]$;

$PH(i,k) = 10 \log(\min(Pcmax, Pcm)/Pcalc\_pucch)[dB]$;

$PH(i,k) = 10 \log(\min(Pcmax, Pcm)/(Pcalc\_pusch + Pcalc\_pucch))[dB]$;

or $PH(i,k) = 10 \log(Pcmax/(Pcalc\_pusch + Pcalc\_pucch))[dB]$

The term Pcm denotes power at which EVM/ACLR is violated and is a maximum power value that reflects a required power back-off due to increased CM. Pcm may be estimated by the WTRU for UL transmission in the subframe of interest or may be estimated according to a lookup table based on the transmission details including, for example, PUCCH power, PUSCH power, modulations, and number of discontinuities. The lookup table may be signaled by higher layers or implemented in the eNB. In the above equations, Pcmax may be replaced by Pcmax(k).

Each type of PH may be computed and reported as appropriate. The type of PH reported may be determined by higher layer signaling. A schedule for each type may be setup by higher layer signaling or the type of PH report may be a function of the PDCCH.

CM may also be accounted for in PHR calculation. An eNB may have information regarding the details of the allocation for both PUSCH and PUCCH. The eNB may estimate the CM, but not necessarily the precise reduction in $P_{CMAX}$ or $P_{CMAX}(k)$ required.

A WTRU may transmit SRS in configured SRS subframes where SRS may be used for UL scheduling at the eNB. The SRS transmit power may follow the PUSCH transmit power, compensating for the bandwidth of the SRS transmission. A WTRU may not transmit SRS when the computed transmit power of SRS exceeds $P_{CMAX}$ or $P_{CMAX}(k)+\gamma_{SRS}$ where $\gamma_{SRS}$ is a threshold which is provided by higher layers.

The WTRU may not transmit SRS when SRS and PUSCH transmissions coincide in the same subframe and the transmit power of PUSCH for the given subframe exceeds $P_{CMAX}$ or $P_{CMAX}(k))+\gamma_{PUSCH}$. The WTRU may use the last OFDM symbol for the transmission of PUSCH as well. Furthermore, the WTRU may not transmit SRS with simultaneous PUSCH/PUCCH transmission, when SRS and PUSCH/PUCCH transmissions coincide in the same subframe and the sum of the transmit powers of PUSCH and PUCCH for the given subframe exceeds $P_{CMAX}$ or $P_{CMAX}(k)+\gamma_{PUSCH\_PUCCH}$, where $\gamma_{PUSCH\_PUCCH}$ is a threshold which is provided by higher layers. The WTRU may use the last OFDM symbol for the simultaneous PUSCH/PUCCH transmission.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for uplink transmission power control in a wireless transmit receive unit (WTRU), the WTRU configured, at least in part, to transmit simultaneously a first uplink channel and a second uplink channel in one or more uplink carriers, the method comprising:
    determining a power level of the first uplink channel;
    comparing the power level of the first uplink channel to a threshold indexed to at least one uplink carrier to determine a power difference;
    determining a value for a power level of the second uplink channel indexed to the at least one uplink carrier; and
    setting the power level of the second uplink channel to whichever of the power difference or the determined value is lower, the setting the power level of the second uplink channel not including scaling any of: the power level of the first uplink channel, the power difference, or the determined value for the power of the second uplink channel.

2. The method of claim 1, wherein the determining a power level of the first uplink channel includes calculating a power level of the first uplink channel indexed to the at least one uplink carrier.

3. The method of claim 1, wherein the first uplink channel is a physical uplink control channel (PUCCH) and the second uplink channel is a physical uplink shared channel (PUSCH).

4. The method of claim 1, wherein the threshold is a maximum WTRU transmit power indexed to the at least one uplink carrier.

5. The method of claim 1, wherein the uplink transmit power is determined for a physical uplink control channel (PUCCH).

6. A method of transmission power control in a wireless transmit receive unit (WTRU), the method comprising:
    determining a transmission power level for one or more physical channels for each of a plurality of carriers, the one or more physical channels including a physical uplink shared channel (PUSCH);
    summing the transmission power level for the one or more physical channels for each of the plurality of carriers to obtain a combination power level;
    determining a maximum transmit power for the WTRU;
    comparing the combination power level to the maximum transmit power of the WTRU; and
    determining a power scaling scheme for at least one of the one or more physical channels of at least one of the plurality of carriers upon the combination power level exceeding the maximum transmit power of the WTRU, the power scaling scheme including reducing a WTRU total transmission power over one or more of the plurality of carriers, the reduction based on a priority of at least one of: a PUSCH with uplink control information (UCI), or a PUSCH without UCI, transmitted on the one or more of the plurality of carriers, the priority of the PUSCH with UCI being higher than the priority of the PUSCH without UCI.

7. The method of claim 6, wherein the power scaling scheme further includes:
    comparing the transmission power level for one or more of a plurality of carriers to a respective carrier total transmission power threshold; and
    adjusting the transmission power level to the respective carrier total transmission power threshold for at least one of the one or more of the plurality of carriers for which the comparison indicates the transmission power level exceeds the respective carrier total transmission power threshold.

8. The method of claim 6, wherein the power scaling scheme further includes:
    the PUSCH without UCI transmitted on the one or more of the plurality of carriers to zero.

9. A wireless transmit receive unit (WTRU) configured to determine uplink (UL) transmission power control, the WTRU comprising:
    a transmitter configured to transmit simultaneously a first uplink channel and a second uplink channel in one or more uplink carriers; and a processor configured to:
  determine a power level of the first uplink channel;
  compare the power level of the first uplink channel to a threshold indexed to at least one uplink carrier to determine a power difference;
  determine a value for a power level of the second f uplink channel indexed to the at least one uplink carrier; and
  set the power level of the second uplink channel to whichever of the power difference or the determined value is lower, the power level of the second uplink channel being set without scaling any of: the power level of the first uplink channel, the power difference, or the determined value for the power of the second uplink channel.

10. The WTRU of claim 9, wherein the processor is further configured, as part of the determining a power level of the first uplink channel, to calculate a power level of the first uplink channel indexed to the at least one uplink carrier.

11. The WTRU of claim 9, wherein the processor is further configured such that the first uplink channel is a physical uplink control channel (PUCCH) and the second uplink channel is a physical shared channel (PUSCH).

12. The WTRU of claim 9, wherein the processor is further configured such that the threshold is a maximum WTRU transmit power indexed to the at least one uplink carrier.

13. The WTRU of claim 9, wherein the processor is further configured such the uplink transmit power is determined for a physical uplink control channel (PUCCH).

14. A wireless transmit receive unit (WTRU) configured to determine uplink (UL) power, the WTRU comprising a processor, wherein the processor is configured to:
  determine a transmission power level for one or more physical channels for each of a plurality of carriers, the one or more physical channels including a physical uplink shared channel (PUSCH);
  sum the transmission power level for the one or more physical channels for each of the plurality of carriers to obtain a combination power level;
  determine a maximum transmit power for the WTRU;
  compare the combination power level to the maximum transmit power of the WTRU; and
  determine a power scaling scheme for at least one of the one or more physical channels of at least one of the plurality of carriers upon the combination power level exceeding the maximum transmit power of the WTRU, the power scaling scheme including a reduction of a WTRU total transmission power over one or more of the plurality of carriers, the reduction based on a priority of at least one of: a PUSCH with uplink control information (UCI), or a PUSCH without UCI, transmitted on the one or more of the plurality of carriers, the priority of the PUSCH with UCI being higher than the priority of the PUSCH without UCI.

15. The method of claim 14, wherein the processor is further configured, as part of the power scaling scheme, to:
  compare the transmission power level for one or more of a plurality of carriers to a respective carrier total transmission power threshold; and
  adjust the transmission power level to the respective carrier total transmission power threshold for at least one of the one or more of the plurality of carriers for which the comparison indicates the transmission power level exceeds the respective carrier total transmission power threshold.

16. The method of claim 14, wherein the processor is further configured, as part of the power scaling scheme, to:
  scale the PUSCH without UCI transmitted on the one or more of the plurality of carriers to zero.

* * * * *

UNITED STATES PATENT AND TRADEMARK OFFICE
CERTIFICATE OF CORRECTION

PATENT NO. : 9,603,099 B2  
APPLICATION NO. : 14/658792  
DATED : March 21, 2017  
INVENTOR(S) : Sung-Hyuk Shin et al.

Page 1 of 1

It is certified that error appears in the above-identified patent and that said Letters Patent is hereby corrected as shown below:

In the Claims

Column 32, Claim 8, Line 59: before "the PUSCH" insert --scaling--;

Column 33, Claim 9, Line 6: after "second" delete "f".

Signed and Sealed this  
Fifth Day of June, 2018

Andrei Iancu  
*Director of the United States Patent and Trademark Office*